(12) United States Patent
Russo et al.

(10) Patent No.: US 10,706,605 B1
(45) Date of Patent: Jul. 7, 2020

(54) VEHICULAR TELEMATIC SYSTEMS AND METHODS FOR GENERATING INTERACTIVE ANIMATED GUIDED USER INTERFACES

(71) Applicant: BLUEOWL, LLC, San Francisco, CA (US)

(72) Inventors: Micah Wind Russo, Oakland, CA (US); Theobolt N. Leung, San Francisco, CA (US); Gareth Finucane, San Francisco, CA (US); Kenneth Jason Sanchez, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

(21) Appl. No.: 16/205,587

(22) Filed: Nov. 30, 2018

(51) Int. Cl.

| | |
|---|---|
| *G06T 13/80* | (2011.01) |
| *G06F 9/451* | (2018.01) |
| *G06F 16/29* | (2019.01) |
| *G06F 16/9537* | (2019.01) |
| *G06T 11/60* | (2006.01) |
| *G01C 21/36* | (2006.01) |
| *B60K 35/00* | (2006.01) |

(52) U.S. Cl.
CPC .............. *G06T 13/80* (2013.01); *G06F 9/453* (2018.02); *G06F 16/29* (2019.01); *G06F 16/9537* (2019.01); *G06T 11/60* (2013.01); *B60K 35/00* (2013.01); *B60K 2370/141* (2019.05); *B60K 2370/143* (2019.05); *B60K 2370/20* (2019.05); *G01C 21/3626* (2013.01); *G01C 21/3664* (2013.01); *G06T 2200/24* (2013.01)

(58) Field of Classification Search
CPC ..... G06T 13/80; G06T 11/60; G06T 2200/24; G06F 9/453; G06F 16/29; G06F 16/9537; B60K 2370/143; B60K 2370/141; B60K 2370/20; B60K 35/00; G01C 21/3626; G01C 21/3664
See application file for complete search history.

(56) References Cited

U.S. PATENT DOCUMENTS

| | | |
|---|---|---|
| 7,765,058 B2 | 7/2010 | Doering |
| 7,908,191 B1 | 3/2011 | Dinamani et al. |

(Continued)

*Primary Examiner* — King Y Poon
*Assistant Examiner* — Vincent Peren
(74) *Attorney, Agent, or Firm* — Faegre Drinker Biddle & Reath LLP

(57) ABSTRACT

Telematics systems and methods are described for generating interactive animated guided user interfaces (GUIs). A telematics cloud platform is configured to receive vehicular telematics data from a telematics device onboard a vehicle. A GUI value compression component determines, based on the vehicular telematics data, a plurality of GUI position values and a plurality of corresponding GUI time values. A geospatial animation app receives the plurality of GUI position values and the plurality of corresponding GUI time values. The geospatial animation app implements an interactive animated GUI that renders a plurality of geospatial graphics or graphical routes on a geographic area map via a display device. The geospatial graphics or graphical routes are rendered to have different visual forms based on differences between respective GUI position values and corresponding GUI time values.

20 Claims, 12 Drawing Sheets

(56) References Cited

U.S. PATENT DOCUMENTS

| | | | |
|---|---|---|---|
| 8,140,358 B1 | 3/2012 | Ling et al. | |
| 9,311,271 B2 | 4/2016 | Wright | |
| 2004/0233070 A1* | 11/2004 | Finnern | G08G 1/096816 340/995.13 |
| 2007/0299603 A1* | 12/2007 | Kirby | G01C 21/28 701/408 |
| 2008/0121690 A1* | 5/2008 | Carani | G01S 5/0027 235/376 |
| 2013/0302758 A1* | 11/2013 | Wright | G07C 5/008 434/65 |
| 2018/0374364 A1* | 12/2018 | Kennedy | G08G 1/205 |
| 2019/0325389 A1* | 10/2019 | Dearing | G06F 3/0482 |

* cited by examiner

VEHICULAR TELEMATIC SYSTEMS AND METHODS FOR GENERATING INTERACTIVE ANIMATED GUIDED USER INTERFACES

FIELD OF THE DISCLOSURE

The present disclosure generally relates to vehicular telematics systems and methods, and more particularly to vehicular telematics systems and methods for generating interactive animated guided user interfaces (GUIs).

BACKGROUND

Telematics information regarding operation of a vehicle may generally be collected for vehicle trips. Such telematics information, however, is typically collected at high volume or high fidelity rates that can include the generation and collection of large numbers of records, such as tens of thousands of telematics records. Such high volume and/or high fidelity telematics records can be generated even for short vehicle trips. In addition, a vehicle trip, that may include tens of thousands of records, generally results in the generation of large file sizes. Such large file sizes are typically impractical for transfer or viewing, especially via mobile devices that have limited computing and memory resources.

Because of the large numbers of telemetry records typically produced in conventional telemetry, a given user's raw vehicle trip telemetry data is generally complicated and unintelligible. For example, users are unable to understand past driving patterns or behavior from the large numbers of telemetry records. This is because a user may be required to not only scroll through the large number of records, but also understand patterns in the telemetry data, which is especially difficult on small screens of modern mobile devices. For example, even though users have large amounts of telemetry records for review, users are still unable to identifying risks, where such risks may include important information including the identification of high accident prone areas or other traffic, vehicle, and/or geographic-related risks. In addition, for the same reasons, users do not have a convenient way to develop an understanding of where they drive over time. Moreover, common simplifications, such as scoring a user's telemetry data, often come across to the user as confrontational.

For the foregoing reasons, there is a need for telematics systems and methods for generating interactive animated guided user interfaces (GUIs) operable to provide scrubbed playback rendering of geospatial graphics.

In addition, there is a need for telematics systems and methods for generating interactive animated guided user interfaces (GUIs) operable to provide rapid playback of multiple vehicular trips.

Still further, there is a need for telematics systems and methods for generating interactive animated guided user interfaces (GUIs) operable to provide geographic heat maps of multiple vehicular trips.

SUMMARY

The disclosure of the present applications provides solutions to overcome the high volume and/or high fidelity rates typically involved with the generation and/or collection of vehicular telemetry data, which can include the generation and collection of large numbers of telemetry records. As described herein, embodiments of the present disclosure allow a user to compress high fidelity telemetry data via display of a vehicle trip as an interactive, animated movie that synchronizes graphical forms (e.g., geospatial graphics and/or graphical routes) of telemetry information with GUI position values and GUI time values on an electronic geographic area map. Such geospatial graphics and geographic area maps allow a user, via an interactive animated GUI, to explore the geographic area map as well as scrub the playback rendering via the geographic area map and/or timeline so as to represent how the user's telemetry data changed during a vehicular trip of the user.

In particular, in various embodiments disclosed herein, vehicular telematics systems and methods are disclosed for generating interactive animated guided user interfaces (GUIs). In some embodiments, the interactive GUIs are operable to provide scrubbed playback rendering of geospatial graphics. The vehicular telematics systems and methods generally comprise a telematics cloud platform configured to receive vehicular telematics data from a telematics device onboard a vehicle. In such embodiments, each of the vehicular telematics data may include a geographic position of the telematics device and a time value of the geographic position. The vehicular telematics data may define a vehicular trip of a vehicle. In addition, the vehicular telematics data may define a telematics dataset having a first data size.

The vehicular telematics systems and methods may further comprise a GUI value compression component implemented at the telematics cloud platform. The GUI value compression component is generally configured to determine, based on the geographic positions and the time values of the vehicular telematics data, a plurality of GUI position values and a plurality of corresponding GUI time values. The plurality of GUI position values and the plurality of corresponding GUI time values may define a GUI value dataset having a second data size. The second data size may have a reduced size compared to the first data size. In several embodiments, the plurality of GUI position values and the plurality of corresponding GUI time values include at least (1) a first GUI position value and a first GUI time value, and (2) a second GUI position value and a second GUI time value.

The vehicular telematics systems and methods may further comprise a geospatial animation app configured to implement an interactive animated GUI on a display device (e.g., mobile device). The interactive animated GUI may be configured to receive the plurality of GUI position values and the plurality of corresponding GUI time values from the telematics cloud platform. The interactive animated GUI may further be configured to render a plurality of geospatial graphics on a geographic area map via the display device. In such embodiments, each geospatial graphic corresponds to a GUI position value of the plurality of GUI position values. In addition, each geospatial graphic is rendered at a GUI time value corresponding to the GUI position value.

In embodiments where an interactive animated GUI is configured to provide scrubbed playback rendering of geospatial graphics, the interactive animated GUI may render the plurality of geospatial graphics in a chronological order. In such embodiments, a first geospatial graphic may be displayed on the geographic area map at the first GUI position value at the first GUI time value. In addition, a second geospatial graphic may be displayed on the geographic area map at the second GUI position value at the second GUI time value. The first geospatial graphic may be rendered to have a first graphical form, and the second geospatial graphic rendered to have a second graphical form. In such embodiments, the first graphic form may be rendered to visually differ from the second graphical form. The visual difference may be based on differences of the first GUI position value or the first GUI position time value compared with the second GUI position value or the second GUI position time value.

Further, in embodiments where an interactive animated GUI is configured to provide scrubbed playback rendering of geospatial graphics, the act of the interactive animated GUI rendering the plurality of geospatial graphics in the chronologic order on the geographic area map generally defines an animated graphical representation of the vehicular trip. In such embodiments, the interactive animated GUI is operable to provide scrubbed playback rendering of the geospatial graphics via user interaction with the geographic area map.

In additional embodiments, the disclosure of the present applications provides solutions to compress high fidelity telemetry data into short-form recap experience(s) defining a plurality of vehicle trips of a vehicle that occurred during a defined time period (e.g., a month). The recap experience may include an interactive, animated vehicular trip end-to-end experience that includes all trips that a user has driven during the defined period. Such trips may define an animated graphical representation of each of the plurality of vehicle trips, which can be displayed over shorter time duration than an original time duration of the trip. In addition, such trips may be displayed with a timeline that can be scrubbed to provide a user with an option to explore previous time periods (e.g., a previous month) of driving.

In particular, in various embodiments disclosed herein, vehicular telematics systems and methods are disclosed for generating interactive animated GUIs operable to provide rapid playback of multiple vehicular trips. Such vehicular telematics systems and methods may include a telematics cloud platform configured to receive vehicular telematics data from a telematics device onboard a vehicle. Each of the vehicular telematics data may include a geographic position of the telematics device and a time value of the geographic position. In addition, the vehicular telematics data may define a plurality of vehicle trips of a vehicle that occurred during a defined time period (e.g., a month) for a first time duration. Still further, the vehicular telematics data may define a telematics dataset having a first data size.

Vehicular telematics systems and methods regarding rapid playback may further include a GUI value compression component implemented at the telematics cloud platform. The GUI value compression component may be configured to determine, based on the geographic positions and the time values of the vehicular telematics data, a plurality of GUI position values and a plurality of corresponding GUI time values. The plurality of GUI position values and the plurality of corresponding GUI time values may define a GUI value dataset having a second data size. In such embodiments, the second data size may have a reduced size compared to the first data size. In some embodiments, the plurality of GUI position values and the plurality of corresponding GUI time values may include at least (1) a first GUI position value and a first GUI time value, and (2) a second GUI position value and a second GUI time value.

Vehicular telematics systems and methods regarding rapid playback may further include a geospatial animation app configured to implement an interactive animated GUI on a display device. The geospatial animation app and/or interactive animated GUI may receive the plurality of GUI position values and the plurality of corresponding GUI time values. In addition, the geospatial animation app and/or interactive animated GUI may render a plurality of geospatial graphics on a geographic area map via the display device. In such embodiments, each geospatial graphic may correspond to a GUI position value of the plurality of GUI position values, and each geospatial graphic rendered at a GUI time value corresponding to the GUI position value.

Further, in embodiments where an interactive animated GUI is configured to provide rapid playback of multiple vehicular trips, the interactive animated GUI may render the plurality of geospatial graphics in a chronological order. In such embodiments, a first geospatial graphic may be displayed on the geographic area map at the first GUI position value at the first GUI time value. In addition, a second geospatial graphic may be displayed on the geographic area map at the second GUI position value at the second GUI time value. In such embodiments, the first geospatial graphic may be rendered to have a first graphical form, and the second geospatial graphic may be rendered to have a second graphical form. Generally, the first graphic form is rendered to visually differ from the second graphical form based on differences of the first GUI position value or the first GUI position time value compared with the second GUI position value or the second GUI position time value.

Additionally, in embodiments where an interactive animated GUI is configured to provide rapid playback of multiple vehicular trips, the act of the interactive animated GUI rendering the plurality of geospatial graphics in a chronologic order on the geographic area map may define an animated graphical representation of each of the plurality of vehicle trips. The animated graphical representation is displayed over a second time duration that is shorter in duration than the first time duration.

In additional embodiments, the disclosure of the present applications provides solutions to compress high fidelity telemetry data into a geographic heat map defining multiple vehicular trips. In such embodiments, a user's past trips may be compiled into a heat map that highlights the frequency of travel of certain routes and/or areas. Still further, accident data and other risk factors can be overlaid on the heat map to visually communicate different segments of risk to a user.

In particular, in various embodiments disclosed herein, vehicular telematics systems and methods are disclosed for generating interactive animated GUIs operable to provide geographic heat maps of multiple vehicular trips. In such embodiments, a telematics cloud platform is configured to receive vehicular telematics data from a telematics device onboard a vehicle. Each of the vehicular telematics data may include a geographic position of the telematics device and a time value of the geographic position. In addition, the vehicular telematics data may define a plurality of vehicle trips of a vehicle navigating actual routes within a certain geographic area. The vehicular telematics data may define a telematics dataset having a first data size.

Vehicular telematics systems and methods regarding geographic heat maps may further include a GUI value compression component implemented at the telematics cloud platform. The GUI value compression component may be configured to determine, based on the geographic positions and the time values of the vehicular telematics data, a plurality of GUI position values and a plurality of corresponding GUI time values. In such embodiments, the plurality of GUI position values and the plurality of corresponding GUI time values may define a GUI value dataset having a second data size. The second data size may have a reduced size compared to the first data size. In some embodiments, the plurality of GUI position values and a plurality of corresponding GUI time values may include at least (1) a first set of GUI position values and a first set of corresponding GUI time values, and (2) a second set of GUI position values and a second set of corresponding GUI time values.

Vehicular telematics systems and methods regarding geographic heat maps may further include a geospatial animation app configured to implement an interactive animated GUI on a display device. In such embodiments, the geospatial animation app and/or interactive animated GUI may be configured to receive the plurality of GUI position values and the plurality of corresponding GUI time values. In addition, the geospatial animation app and/or interactive animated GUI may be configured to render a plurality of graphical routes on a geographic area map via the display device. In such embodiments, each of the graphical routes may be rendered with a weight or a color determined from the plurality of GUI position values and the plurality of corresponding GUI time values. The weight or the color of each graphical route may visually represent a quantity of the plurality of GUI position values and the plurality of corresponding GUI time values as associated with the graphical route.

Still further, in embodiments where an interactive animated GUI is configured to provide geographic heat maps of multiple vehicular trips, a first graphical route may be displayed on the geographic area map representative of the first set of GUI position values and the first set of corresponding GUI time values. In addition, a second graphical route may be displayed on the geographic area map representative of the second set of GUI position values and the second set of corresponding GUI time values. In such embodiments, the first graphical route may be rendered to have a first weight or a first color, and the second graphical route rendered to have a second weight or a second color. Additionally, or alternatively, the first weight or the first color may be rendered to visually differ from the second weight or the second color. Such visual difference may be based on the differences of a first quantity of GUI values of the first set of GUI position values and the first set of corresponding GUI time values compared with a second quantity of GUI values of the second set of GUI position values and the second set of corresponding GUI time values.

Still further, in embodiments where an interactive animated GUI is configured to provide geographic heat maps of multiple vehicular trips, the act of an interactive animated GUI rendering the plurality of graphical routes on the geographic area map may define a geographic heat map representation of each of the plurality of vehicle trips. In such embodiments, the geographic heat map representation may visually represent a frequency of travel of the actual routes within the geographic area.

In accordance with the above, and with the disclosure herein, the present disclosure includes improvements in computer functionality or in improvements to other technologies at least because the claims recite, e.g., telematics systems and methods that generate interactive animated guided user interfaces (GUIs) to provide scrubbed playback rendering of geospatial graphics, rapid playback of multiple vehicular trips, and geographic heat maps of multiple vehicular trips. That is, the present disclosure describes improvements in the functioning of the computer itself or "any other technology or technical field" because the field of vehicular telematics, and related computing devices thereof, are improved with animated guided user interfaces (GUIs) to visualize large quantities of otherwise unintelligible telematics data. This improves over the prior art at least because, in the past, users were unable to understand past driving patterns or behavior from large numbers of telemetry records, where a user was required to not only scroll through the large number of records, but also understand patterns in the telemetry data, which is especially difficult on small screens of modern mobile devices.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Figure 1A:
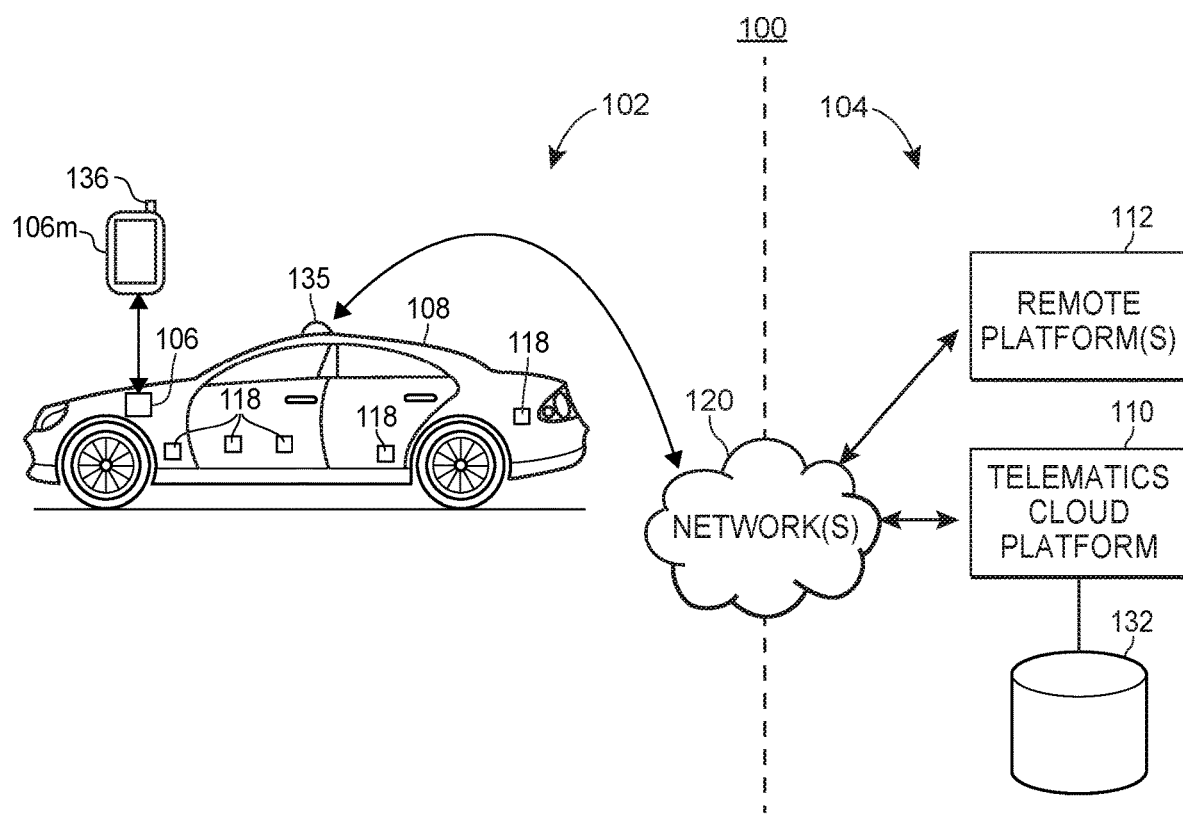
FIG. 1A illustrates a telematics cloud platform configured to receive vehicular telematics data from a telematics device onboard a vehicle in accordance with various embodiments disclosed herein.

FIG. 1A represents an embodiment of a vehicular telematics system 100 for generating interactive animated guided user interfaces (GUIs), which includes infrastructure, including hardware devices, as described for various telematics system and methods embodiments herein. In particular, FIG. 1A illustrates a telematics cloud platform 110 configured to receive vehicular telematics data from one or more telematics devices (e.g., telematics device 106i and/or mobile device 106m) onboard a vehicle 108. As the term is used herein, "telematics data" may include vehicle specific data and/or vehicle environment related data that is generated, collected, monitored, measured, transmitted and/or otherwise manipulated by one or more telematics devices (e.g., telematics device 106i and/or mobile device 106m) associated with a vehicle. The telematics data may include various metrics that indicate the direction, speed, acceleration, braking, cornering, and/or motion of the vehicle in which the data is associated. Such data may be determined from sensors (e.g., sensors 118) on board the vehicle, GPS systems, or other such device described herein. The telematics data may include geographic position information defining a geographic location of the telematics device associated with a vehicle. Such data may include latitude and longitude coordinates, for example. The telematics data may further include time value of the geographic position information, defining a specific point in time the telematics device was at a given geographic location.

Generally, telematics system 100 may include both hardware and software components, where software components may execute on the hardware devices. Telematics system 100 may communicate via various data communication channels for communicating data (e.g., telematics data) between and among the various components. It should be appreciated that telematics system 100 is merely an example and that alternative or additional components are envisioned.

As illustrated in FIG. 1A, telematics system 100 may be segmented into a set of front-end components 102 and a set of back-end components 104. The front-end components 102 may include a vehicle 108 which may be, for example, an automobile, a car, a truck, a tow truck, a snowplow, a boat, a motorcycle, a motorbike, a scooter, a recreational vehicle, or any other type of vehicle capable of roadway or water travel. Telematics device 106i may be may be permanently or removably installed onboard vehicle 108, and may generally be an on-board computing device capable of performing various functionalities relating to vehicular telemetric data generation, collection, and/or transmission. For example, in some embodiments, telematics device 106i may be an integrated device of the vehicle. Further, telematics device 106i may be installed by the manufacturer of vehicle 108, or as an aftermarket modification or addition to vehicle 108. In FIG. 1A, although only one telematics device 106i is depicted, it should be understood that in some embodiments, a plurality of computers telematics devices 106i (which may be installed at one or more locations within vehicle 108) may be used.

Telematics system 100 may further include mobile device 106m that may be associated with vehicle 108, where mobile device 106m may be any type of electronic device such as a smartphone, notebook computer, tablet, "phablet," GPS (Global Positioning System) or GPS-enabled device, smart watch, smart glasses, smart bracelet, wearable electronic, PDA (personal digital assistants), pager, computing device configured for wireless communication, and/or the like. Mobile device 106m may implement one or more mobile operation systems, such as APPLE IOS or GOOGLE ANDROID. Mobile device 106m may be equipped or configured with a set of sensors, such as a location module (e.g., a GPS chip), an image sensor, an accelerometer, a clock, a gyroscope, a compass, a yaw rate sensor, a tilt sensor, and/or other sensors.

Mobile device 106m may belong to or be otherwise associated with a user, where the user may be an owner of vehicle 108 or otherwise associated with vehicle 108. For example, in some embodiments, mobile device 106m may be a mobile device of a user, where such mobile device performs any and/or all of a telematics device as described herein. For example, the user may rent vehicle 108 for a variable or allotted time period, or the individual may at least partially operate (or be a passenger of) vehicle 108 as part of a ride share. Generally, the user may at least partially operate vehicle 108 (and may thus be an operator of the vehicle), or may be a passenger of vehicle 108 (e.g., if vehicle 108 is an autonomous vehicle). According to embodiments, a user may carry or otherwise have possession of mobile device 106m during operation of vehicle 108, regardless of whether the individual is the operator or passenger of vehicle 108.

In some embodiments, telematics device 106i may operate in conjunction with mobile device 106m to perform any or all of the functions described herein, including generating, collecting, and/or transmitting telematics data as described herein. In other embodiments, telematics device 106i may perform any or all of the on-board vehicle functions described herein, in which case mobile device 106m may not be present or may not be connected to telematics device 106i. In still other embodiments, mobile device 106m may perform any or all of the onboard functions described herein.

Telematics device 106i and/or mobile device 106m may communicatively interface with one or more on-board sensors 118 that are disposed on or within vehicle 108 and that may be utilized to monitor vehicle 108 and the environment in which vehicle 108 is operating. In particular, the one or more on-board sensors 118 may sense conditions associated with vehicle 108 and/or associated with the environment in which vehicle 108 is operating, and may generate telematics data indicative of the sensed conditions. For example, the telematics data may include a location and/or operation data indicative of operation of vehicle 108. In some configurations, at least some of the on-board sensors 118 may be fixedly disposed at various locations on vehicle 108. Additionally or alternatively, at least some of the on-board sensors 118 may be incorporated within or connected to telematics device 106i. Still additionally or alternatively, in some configurations, at least some of the on-board sensors 118 may be included on or within mobile device 106m.

The on-board sensors 118 may communicate respective telematics data to telematics device 106i and/or to mobile device 106m, and the telematics data may be processed using telematics device 106i and/or mobile device 106m to determine when vehicle 108 is in operation as well as determine information regarding operation of vehicle 108. In some situations, the on-board sensors 118 may communicate respective telematics data indicative of the environment in which vehicle 108 is operating. For example, telematics device 106i and/or mobile device 106m may additionally be configured to obtain geographic location data and/or telematics data by communicating with sensors 118. In some embodiments, on-board computer 114 may obtain geographic location data via communication with a vehicle-integrated global navigation satellite system (GNSS), GPS, etc. To provide additional examples, on-board computer 114 may obtain one or more metrics related to the speed, direction, and/or motion of vehicle 108 via any number of suitable sensors (e.g., sensors 118), which can include speedometer sensors, braking sensors, airbag deployment sensors, crash detection sensors, accelerometers, etc.

According to embodiments, the sensors 118 may include one or more of a GPS unit, a radar unit, a LIDAR unit, an ultrasonic sensor, an infrared sensor, some other type of electromagnetic energy sensor, a microphone (e.g., to support detect/listen for audio/sound wave of siren(s) associated with an emergency vehicle), a radio (e.g., to support wireless emergency alerts or an emergency alert system), an inductance sensor, a camera, an accelerometer, an odometer, a system clock, a gyroscope, a compass, a geo-location or geo-positioning unit, a location tracking sensor, a proximity sensor, a tachometer, a speedometer, and/or the like. Some of the on-board sensors 118 (e.g., GPS, accelerometer, or tachometer units) may provide telematics data indicative of, for example, the vehicle's 108 location, speed, position acceleration, direction, responsiveness to controls, movement, etc.

Other sensors 118 may be directed to the interior or passenger compartment of vehicle 108, such as cameras, microphones, pressure sensors, weight sensors, thermometers, or similar sensors to monitor any passengers, operations of instruments included in vehicle 108, operational behaviors of vehicle 108, and/or conditions within vehicle 108. For example, on-board sensors 118 directed to the interior of vehicle 108 may provide telematics data indicative of, for example, in-cabin temperatures, in-cabin noise levels, data from seat sensors (e.g., indicative of whether or not an individual is using a seat, and thus the number of passengers being transported by vehicle 108), data from seat belt sensors, data regarding the operations of user controlled devices such as windshield wipers, defrosters, traction control, mirror adjustment, interactions with on-board user interfaces, etc. Additionally, the on-board sensors 118 may further detect and monitor the health of the occupant(s) of vehicle 108 (e.g., blood pressure, heart rate, blood sugar, temperature, etc.).

In various embodiments of telematics system 100, front-end components 102 may communicate collected telematics data to back-end components 104 (e.g., via a network(s) 120). In particular, at least one of telematics device 106i or mobile device 106m may communicate with back-end components 104 via the network(s) 120 to enable back-end components 104 to receive and/or store collected telematics data and information regarding usage of vehicle 108.

The network(s) 120 may include a proprietary network, a secure public internet, a virtual private network, and/or some other type of network, such as dedicated access lines, plain ordinary telephone lines, satellite links, cellular data networks, combinations of these and/or other types of networks. The network(s) 120 may utilize one or more radio frequency communication links to communicatively connect to vehicle 108, e.g., utilize wireless communication link(s) to communicatively connect with mobile device 106m and telematics device 106i. Where the network(s) 120 comprises the Internet or other data packet network, data communications may take place over the network(s) 120 via an Internet or other suitable data packet communication protocol. In some arrangements, the network(s) 120 additionally or alternatively includes one or more wired communication links or networks.

Back-end components 104 include one or more servers or computing devices, which may be implemented as a server bank/server farm, or cloud computing platform, and is interchangeably referred to herein as a "telematics cloud platform 110." Telematics cloud platform 110 may include one or more computer processors adapted and configured to execute various software applications and components of telematics system 100, in addition to other software components, as described herein.

Telematics cloud platform 110 may further include or be communicatively connected to one or more data storage devices 132 (e.g., databases), which may be adapted to store telematics data related to the operation of vehicle 108, or GUI value data that is determined from telematics data, as described herein. For example, the one or more data storage devices 132 may be implemented as a data bank or a cloud data storage system, at least a portion of which may be locally accessed by telematics cloud platform 110 using a local access mechanism such as a function call or database access mechanism (e.g., SQL), and/or at least a portion of which may be remotely accessed by telematics cloud platform 110 using a remote access mechanism such as a communication protocol. Telematics cloud platform 110 may access data stored in the one or more data storage devices 132 when executing various functions and tasks associated with the present disclosure, including for example, receiving telematics data from telematics device 106i and/or mobile device 106m, and/or transmitting GUI values to a geospatial animation app as described herein.

Back-end components 104 may further include one or more remote platform(s) 112, which may be any system, entity, repository, or the like, capable of obtaining and storing data that may be indicative of situations, circumstances, environment data, three dimensional data, etc. associated with vehicle operation as described herein. Although FIG. 1A depicts the set of remote platform(s) 112 as separate from the one or more data storage devices 132, it should be appreciated that the set of remote platform(s) 112 may be included as part of the one or more data storage devices 132. In some embodiments, the remote platform(s) 112 may store data indicative of vehicle operation regulations. For example, the third-party source 112 may store speed limit information, direction of travel information, lane information, map information, route information, and/or similar information. The remote platform(s) 112 may also maintain or obtain real-time data indicative of traffic signals for roadways (e.g., which traffic signals currently have red lights or green lights). It should be appreciated that the one or more data storage devices or entities 132 may additionally or alternatively store the data indicative of vehicle operation regulations.

To communicate with telematics cloud platform 110 and other portions of back-end components 104, front-end components 102 may include a communication component(s)

135, 136 that are configured to transmit information to and receive information from back-end components 104. The communication components 135, 136 may include one or more wireless transmitters or transceivers operating at any desired or suitable frequency or frequencies.

Wireless transmitters or transceivers may operate at different frequencies and/or by using different protocols, if desired. In an example, mobile device 106*m* may include a respective communication component 136 for sending or receiving information to and from telematics cloud platform 110 via the network(s) 120, such as over one or more radio frequency links or wireless communication channels which support a first communication protocol (e.g., GSM, CDMA, LTE, one or more IEEE 802.11 standards such as Wi-Fi, WiMAX, BLUETOOTH, etc.). Additionally or alternatively, telematics device 106*i* may operate in conjunction with an on-board transceiver or transmitter 135 that is disposed at vehicle 108 (which may, for example, be fixedly attached to vehicle 108) for sending or receiving information to and from telematics cloud platform 110 via the network(s) 120, such as over one or more radio frequency links or wireless communication channels which support the first communication protocol and/or a second communication protocol.

In some embodiments, telematics device 106*i* may operate in conjunction with mobile device 106*m* to utilize the communication component 136 of mobile device 106*m* to deliver telematics data to back-end components 104. Similarly, telematics device 106*i* may operate in conjunction with mobile device 106*m* to utilize the communication component 135 of vehicle 108 to deliver telematics data to back-end components 104. In some embodiments, the communication components 135, 136 and their respective links may be utilized by telematics device 106*i* and/or mobile device 106*m* to communicate with back-end components 104.

Accordingly, either one or both of mobile device 106*m* or telematics device 106*i* may communicate (e.g., send telematics data) via network(s) 120 over the link(s). Additionally, in some configurations, mobile device 106*m* and telematics device 106*i* may communicate with one another directly over a wireless or wired link. Telematics device 106*i* and/or mobile device 106*m* disposed at vehicle 108 may communicate via the network(s) 120 and the communication component(s) 135, 136 by using one or more suitable wireless communication protocols (e.g., GSM, CDMA, LTE, one or more IEEE 802.11 Standards such as Wi-Fi, WiMAX, BLUETOOTH, etc.).

Figure 1B:
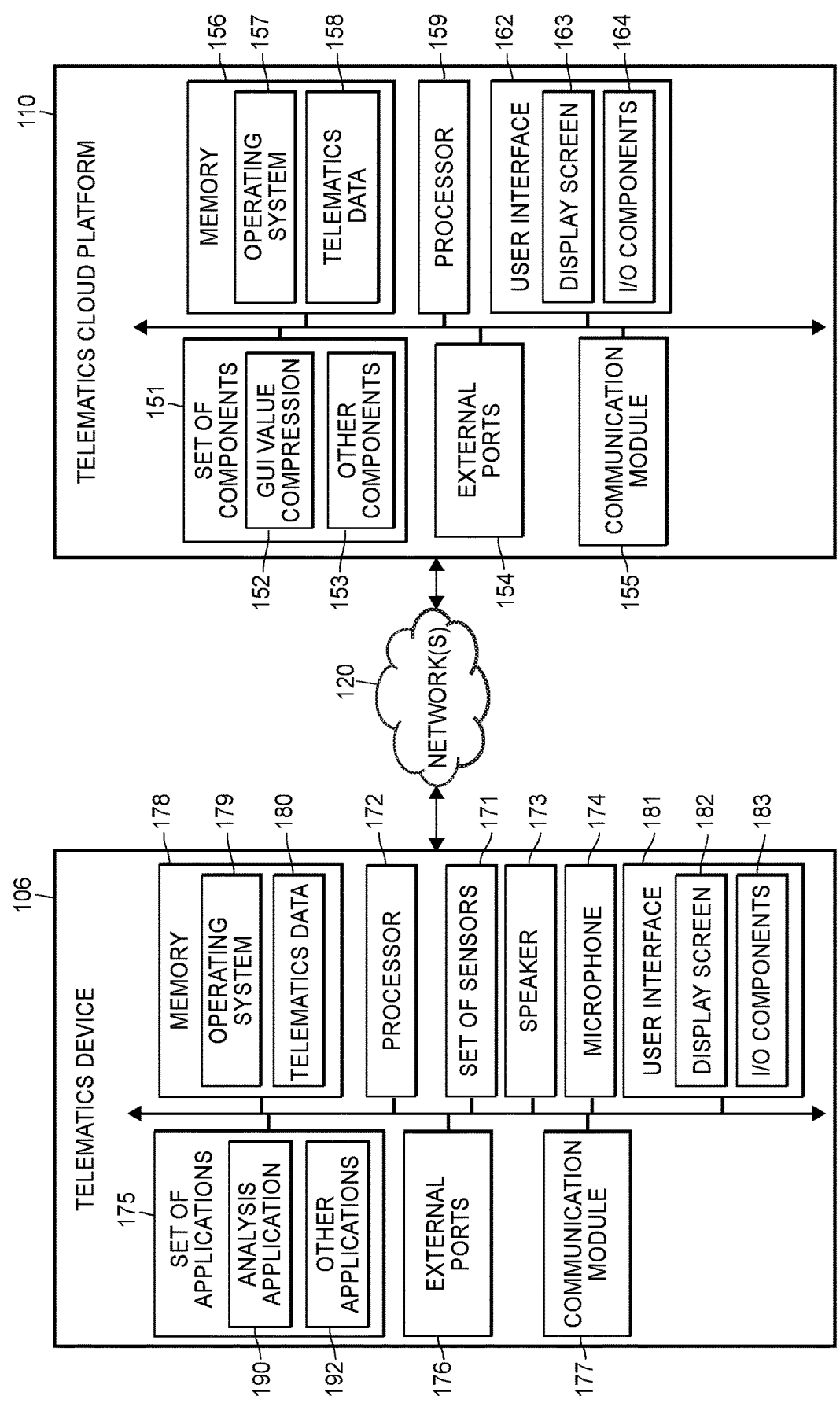
FIG. 1B illustrates a block diagram of the telematics cloud platform and the telematics device of FIG. 1A in accordance with various embodiments disclosed herein.

FIG. 1B illustrates a block diagram of telematics cloud platform 110 and a telematics device 106 (e.g., telematics device 106*i* and/or mobile device 106*m*) of FIG. 1A in accordance with various embodiments disclosed herein. In particular, FIG. 1B illustrates a hardware diagram of an example telematics device 106 (such as telematics device 106*i* and/or mobile device 106*m* as discussed with respect to FIG. 1A) and an example telematics cloud platform 110 (e.g., telematics cloud platform 110 as discussed with respect to FIG. 1A), in which the systems and methods as discussed herein may be implemented.

As shown in FIG. 1B, telematics device 106 may include a processor 172 as well as a memory 178. Memory 178 may store an operating system 179 capable of facilitating the functionalities as discussed herein as well as a set of applications 175 (i.e., machine readable instructions). For example, one of the set of applications 175 may be an analysis application 190 configured to facilitate several of the functionalities as discussed herein. It should be appreciated that one or more other applications 192 are envisioned, such as an application for generating, collecting, monitoring, measuring, and/or transmitting telematics data via telematics device 106 as described herein.

Processor 172 may interface with the memory 178 to execute the operating system 179 and the set of applications 175. According to some embodiments, the memory 178 may also include telematics data 180 including data accessed or collected from a set of sensors (e.g., sensors 118) or directly via a telematics device (e.g., telematics device 106*i* and/or mobile device 106*m*). The memory 178 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Telematics device 106 may further include a communication module 177 configured to communicate data via one or more networks 120. According to some embodiments, the communication module 177 may include one or more transceivers (e.g., WWAN, WLAN, and/or WPAN transceivers) functioning in accordance with IEEE standards, 3GPP standards, or other standards, and configured to receive and transmit data via one or more external ports 176. For example, the communication module 177 may interface with another device, component, or sensors via the network(s) 120 to retrieve sensor data.

In some embodiments, telematics device 106 may include a set of sensors 171 such as, for example, a location module (e.g., a GPS chip), an image sensor, an accelerometer, a clock, a gyroscope, a compass, a yaw rate sensor, a tilt sensor, telematics sensors, and/or other sensors. Telematics device 106 may further include user interface 181 configured to present information to a user and/or receive inputs from the user. As shown in FIG. 1A, the user interface 181 may include a display screen 182 and I/O components 183 (e.g., ports, capacitive or resistive touch sensitive input panels, keys, buttons, lights, LEDs). According to some embodiments, the user may access telematics device 106 via the user interface 181 to review information, make selections, and/or perform other functions. Additionally, telematics device 106 may include a speaker 173 configured to output audio data and a microphone 174 configured to detect audio.

In some embodiments, telematics device 106 may perform the functionalities as discussed herein as part of a "cloud" network (e.g., via network(s) 120 and telematics cloud platform 110) or may otherwise communicate with other hardware devices or software components within the cloud to send, retrieve, or otherwise analyze data. In some embodiments, telematics cloud platform 110 may operates as a Software-as-a-Service (SaaS) or Platform-as-a-Service (Paas), providing the functionality of telematics cloud platform 110 remotely to software apps and other components in accordance with the various embodiments described herein.

As illustrated in FIGS. 1A and 1B, telematics device 106 may communicate and interface with telematics cloud platform 110 via the network(s) 120. Telematics cloud platform 110 may include a processor 159 as well as a memory 156. The memory 156 may store an operating system 157 capable of facilitating the functionalities as discussed herein as well as a set of components 151 (i.e., machine readable instructions). For example, one of the set of components 151 may include GUI value compression component 152 configured to facilitate several of the functionalities discussed herein. It should be appreciated that one or more other components 153 are envisioned.

The processor 159 may interface with the memory 156 to execute the operating system 157 and the set of applications 151. According to some embodiments, the memory 156 may also include telematics data 158, such as telematics data received from telematics device 106, and/or other data, other data as described herein. The memory 456 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Telematics cloud platform 110 may further include a communication module 155 configured to communicate data via the one or more networks 120. According to some embodiments, the communication module 155 may include one or more transceivers (e.g., WWAN, WLAN, and/or WPAN transceivers) functioning in accordance with IEEE standards, 3GPP standards, or other standards, and configured to receive and transmit data via one or more external ports 154. For example, the communication module 155 may receive, from telematics device 106, a set(s) of sensor data.

Telematics cloud platform 110 may further include user interface 162 configured to present information to a user and/or receive inputs from the user. As shown in FIG. 1A, the user interface 162 may include a display screen 163 and I/O components 464 (e.g., ports, capacitive or resistive touch sensitive input panels, keys, buttons, lights, LEDs). According to some embodiments, the user may access telematics cloud platform 110 via the user interface 162 to review information, make changes, input training data, and/or perform other functions.

In some embodiments, telematics cloud platform 110 may perform the functionalities as discussed herein as part of a "cloud" network or may otherwise communicate with other hardware or software components within the cloud to send, retrieve, or otherwise analyze data.

In general, a computer program product in accordance with any embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 172, 159 (e.g., working in connection with the respective operating systems 179, 157) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, JavaScript, CSS, XML). In some embodiments, the computer program product may be part of a cloud network of resources.

Figure 2:
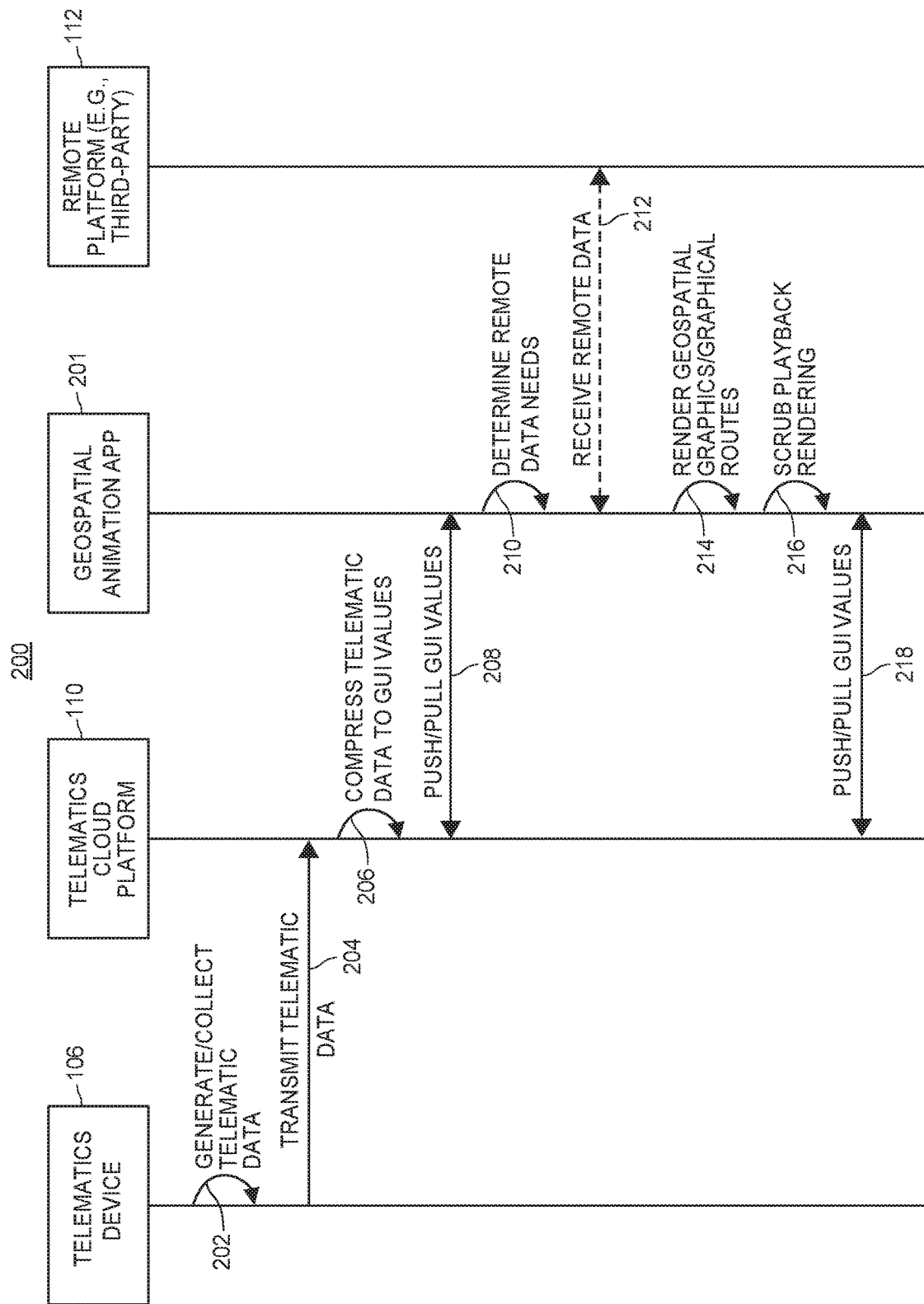
FIG. 2 illustrates a data transmission and implementation diagram of an example vehicular telematics system for generating interactive animated guided user interfaces (GUIs) in accordance with various embodiments disclosed herein.

FIG. 2 illustrates a data transmission and implementation diagram of an example vehicular telematics system 200 for generating interactive animated GUIs in accordance with various embodiments herein. Telematics system 200 may include all, or part, of the computing devices, features, and/or other functionality as described herein for FIGS. 1A and 1B. Accordingly, the disclosure for FIGS. 1A and 1B applies the same or similarly for FIG. 2. In particular, telematics system 200 includes telematics device 106 (e.g., telematics device 106i and/or mobile 106m), telematics cloud platform 110, and remote platform 112, each as described herein with respect to FIGS. 1A and 1B.

In the embodiment of FIG. 2, telematics device 106 generates and/or collects (202) telematics data associated with operation of a vehicle (e.g., vehicle 108) during one or more vehicle trips of a vehicle. Telematics device 106 (e.g., telematics device 106i and/or mobile device 106m) may collect the telematics data, e.g., via sensors 118, GPS systems, or other systems or components as described herein for FIGS. 1A and 1B. In this way, vehicular telematics data, as described herein, may define a vehicular trip of a vehicle (e.g., vehicle 108). In various embodiments, a plurality of vehicular telematics defining a vehicular trip of a vehicle may define a telematics dataset having a certain data size (e.g., several gigabytes or megabytes of data). The data size is generally proportional to the number of telematics data records collected for the vehicle trip.

In some embodiments, the telematics data, as generated or collected by telematics device 106, may include thousands, and in some instances millions or more, records of data. For example, in certain embodiments the telematics data may comprise 15 Hertz (Hz) data, such as telematics data that is generated or collected 15 times per second. In such embodiments, a trip with a duration of 10 minutes would result in the generation and/or collection of 9,000 telematics data records.

A telematics data record, as the term is used herein, may refer to an instance of vehicle or vehicle environment data determined at a particular time. For example, in various embodiments herein, each telematics data record of a plurality of telematics data may include a geographic position of a telematics device (e.g., telematics device 106i and/or mobile device 106m) and a time value of the geographic position. In this way, telematics data is able to define a state of vehicle and/or telematics device at a given point in time. As recorded, a telematics data record may comprise a single row of data as may be represented in a data table, relational database, or other data structure. In some embodiments, the telematics data may be associated with a particular user. For example, the telematics data may be associated with a driver or passenger of the vehicle (e.g., vehicle 108).

With respect to the embodiment of FIG. 2, telematics device 106 transmits (204) the telematics data (e.g., via network(s) 120) to telematics cloud platform 110. Telematics platform 110 receives (e.g., via its external ports and/or communication modules 155) and processes the telematics data. Processing telematics data may refer to, but is not limited to, compressing and/or reducing the telematics data into GUI values as descried herein, or performing post-processing analysis, such as determining start times for trip, positions, times, or other data or information as described herein, from the received telematics data. In some embodiments, processing telematics data may attach metadata to the telematics data records, or GUI values, where such metadata includes data generated, determined from, or otherwise resulting from the telematics data as received from telematics device 106.

In some embodiments, because of the large number of telematics data records generally received from telematics device 106, telematics platform 110 may receive (e.g., via its external ports and/or communication modules 155) and process the telematics data using data efficient techniques. For example, in some embodiments, telematics data, as received by telematics device 106, is processed by telematics cloud platform 110 via an asynchronous process. In such embodiments, telematics cloud platform 110 may comprise a plurality of software components, including consumer components and producer components. The consumer components are implemented to receive and/or store (e.g., in memory 156 or data storage devices 132) incoming telematics data. The producer components are implemented to process the telematics data, for example, by compressing the telematics data into GUI values, or performing post-processing analysis as described herein.

In some embodiments, the consumer components and the producer components may implemented via multiple computational threads, in a multi-threaded environment of the telematics cloud platform 110. In a multi-threaded environment, consumer components and producer components may operate at the same time so as to increase the throughput and efficiency of the processing of the telematics data as described herein.

Other embodiments for receiving and processing telematics data is contemplated herein, such that the telematics system and methods are not limited to consumer/producer embodiments. For example, in some embodiments, a single software component may be implemented for receiving and processing all telematics data. In certain embodiments, for example, telematics data could store telematics data in memory (e.g., in memory 156 or data storage devices 132), where a batch component of the telematics cloud form 110 could select certain amounts of telematics data to process at one time. In this way, such embodiments result in batch processing of received telematics data. In such embodiments, telematics cloud platform 110 may be configured to batch process the telematics data at specific time intervals (e.g., every minute, hour, day, etc.).

In still further embodiments, telematics data may be processed only when a request is received from a client device (e.g., mobile device of user) for the data. For example, a geospatial animation app executing on a mobile device, as described herein, may be configured to request data for a particular time period, which may cause the telematics cloud platform 110, e.g., via a client component, to process telematics data in real-time in order to respond to the request. It should be appreciated that portions of and/or combinations of any or all of the above embodiments may be used to process and receive telematics data as part of the telematics systems and methods as described herein.

Telematics cloud platform 110 may include a GUI value compression component (e.g., GUI value compression component 152 of FIG. 1B) configured to compress or reduce (206) telematics data received from telematics component 106 to a reduced set of GUI values. In some implementations, GUI value compression component may be configured compress telematics data by determining a plurality of GUI position values and a plurality of corresponding GUI time values. In some embodiments, the plurality of GUI position values and the plurality of corresponding GUI time values may be based on the geographic positions and the time values of the vehicular telematics data received from telematics device 106. In certain embodiments, at least one GUI position value may correspond to a particular geographic position of the vehicular telematics data as received from telematics device 106. In such embodiments, the GUI position value may have the same representative position value as a geographic position of the vehicular telematics data. In other embodiments, however, the GUI position value may have a different position value from any given geographic position of the vehicular telematics data, where such GUI position value may be determined instead from a number of geographic position values of the vehicular telematics data. In such embodiments, the GUI position value may be determined from an average, median, or some other statistical analysis of the vehicular telematics data.

In various embodiments, each GUI position value may have a corresponding GUI time value, such that there is a one-to-one relationship between a GUI position value and its GUI time value. The GUI position value and the GUI time value define a graphical representation of the telematics device as displayed on the geographic area map as described herein. As described in various embodiments herein, the plurality of GUI position values and the plurality of corresponding GUI time values generally include at least (1) a first GUI position value and a first GUI time value, and (2) a second GUI position value and a second GUI time value.

The GUI value compression component may implement various algorithms to compress and/or reduce the telematics data, including, for example, the Ramer-Douglas-Peucker (RDP) algorithm, which can determine a reduced set of points from the telematics data. Such compression or reduction algorithms (e.g., RDP) are implemented by the GUI value compression component to reduce the data payload of the telematics data, while at the same time maintain representative information provided by the original telematics data. In accordance with the disclosure of the telematics systems and methods herein, such compress/reduction provides an immense benefit, and in some cases is necessary, for when telematics data must be represented on a computing device with limited processing and/or memory resources, such as a user mobile device (e.g., a smart phone). For example, a vehicle trip of 10 minutes involving the collection of 15 Hz telematics results in 9,000 telematics data records. The GUI value compression component may be configured to compress or reduce those 9,000 records to 20 records using the RDP or similar algorithm, therefore allowing processing/memory limited devices to receive and display (e.g., via geospatial graphics or graphical routes as described herein) a representative visualization of the telematics data. It is to be understood that such representative telematics data may be displayed via mobile and conventional computing devices, such as a laptop or other computing device, e.g., via a web browser, fat-client program, or otherwise, so as to, e.g., reduce complexity of the telematics data displayed or as reviewed by a user.

In some embodiments, the GUI value compression component operates together with a dataset sequencing component (e.g., one of the other components 153 of FIG. 1B) to determine the GUI values. In such embodiments, telematics cloud platform 110 may further comprise a dataset sequencing component implemented at the telematics cloud platform 110. The dataset sequencing component is configured to determine a sequence of telematics data subsets from the plurality of the vehicular telematics data where each telematics data subset defines a range the plurality of the vehicular telematics data. For example, a first telematics data subset may be determined by dataset sequencing component that defines a first range of the plurality of the vehicular telematics data. Similarly, a second telematics data subset may be determined by dataset sequencing component that defines a second range of the plurality of the vehicular telematics data. In embodiments that use dataset sequencing component, the plurality of GUI position values and the plurality of corresponding GUI time values are determined based on the sequence of telematics data subsets. For example, a first GUI position value of the first GUI time value may be determined from the first telematics data subset, and the second GUI position value and the second GUI time value may be determined from the first telematics data subset. Accordingly, in embodiments regarding the dataset sequencing component, dataset sequencing component generally generates a single value (e.g., the first GUI position value) from the geographic position values of the entire range of the first range of the vehicular telematics data. Additionally, or alternatively, in various embodiments, dataset sequencing component may be used alone or in addition to other algorithms or techniques described herein (e.g., the Ramer-Douglas-Peucker algorithm).

Generally, data compression and/or reduction algorithms and/or techniques (e.g., RDP algorithm and/or dataset sequencing component subset determining, etc.) as described herein, also perform map matching, such that telematics data as received via telematics device 106, when compressed and/or reduced to GUI values, is representative of real geographic locations. For example, the data compression and/or reduction algorithms and/or techniques compress and/or reduce the telematics data to GUI values. GUI values may displayed on an electronic or digital map (e.g., geographic area map) representative of a real world geographic area or location. Such reduction is critical to allow representation of the telematics data on small screen and/or limited processing/memory devices, such as mobile devices. Such implementation can also increase the efficiency of more resource intensive devices, such as servers providing web pages display geographic area maps, etc.

In various embodiments disclosed herein the GUI values, as determined by the GUI value compression component of the telematics cloud platform 110, may define a second data size. In embodiments where the telematics data is reduced or compressed by the GUI value compression component, the second data size may have a reduced size compared to a first data size, where, for example, the first data size includes raw telematics data received by telematics device 106, which may define one or more vehicular trips. The second data size, therefore, may have a much smaller data payload (e.g., kilobytes of data) than the first data size (e.g., megabytes or gigabytes of data).

The telematics system 200 of FIG. 2 also includes a geospatial animation app 201, as described in various embodiments herein. Geospatial animation app 201 is, in some embodiments, a mobile app implemented on a mobile device. In other embodiments, geospatial animation app 201 may include a web app, e.g., implemented via a web browser, or other app implemented on a client device, which may include a fat-client app.

As illustrated in FIG. 2, geospatial animation app 201 may receive (208) GUI values (e.g., a plurality of GUI position values and a plurality of corresponding GUI time values), which may either be pushed from telematics cloud platform 110 to geospatial animation app 201 or pulled from geospatial animation app 201. For example, GUI values may be pulled upon a client request by geospatial animation app 201. A push based implementation may be implemented, for example, where a geospatial animation app 201 established a connection (e.g., session) with telematics cloud platform 110, and the GUI values are pushed over a channel, via network(s) 120, to geospatial animation app 201. Such pull or push based implementations may be used to establish playback rendering and/or scrubbing as described herein.

In various embodiments, telematics cloud platform 110 may implement a representative state transfer (RESTful) application programming interface (API) that exposes the GUI values (e.g., as stored in memory 156 and/or database 132) to be pushed and/or pulled via geospatial animation app 201 as descried herein. For example, in some embodiments, geospatial animation app 201 may access GUI values for any particular time, position, trip duration, by pulling or requesting GUI values from the RESTful API. In other embodiments, geospatial animation app 201 may access GUI values for any particular time, position, trip duration, by receiving pushed GUI values from the RESTful API, where a connection, channel or session was established between animation app 201 and telematics cloud platform 110.

In various embodiments, geospatial animation app 201 includes an interactive animated GUI configured to be implemented on a display device (e.g., mobile device having a display screen). In some embodiments, for example, the display device is a mobile device (e.g., smart phone) of a user. In other embodiments, the display device may also be a screen displaying a website implementing the interactive animated GUI via a web browser. Generally, the interactive animated GUI is configured to allow a user to visualize and/or playback a vehicle trip, which may include allowing the user to see dense city (e.g., San Francisco) movement, and or visualize telemetry data via geospatial graphics, graphical routes, other images over time as described herein. It is to be understood the geospatial animation app implements the interactive animated GUI, and, therefore these terms may be used interchangeably herein to describe GUI features and functionality, such as rendering geospatial graphics, graphical routes, images, or otherwise.

In some embodiments, remote data may be needed for rendering certain features, graphics, or elements via the animated interactive animated GUI. For example, three dimensional images, environment data, or other information available at remote platforms or third-parties may be needed. In such embodiments, geospatial animation app 201 may determine (210) whether there are any remote data needs. If such remote data is needed for a given rendering embodiment, then geospatial animation app 201 will request and receive (212) remote data from remote platform(s) 112. Such remote data may be used for, or during, rendering of geospatial graphics/graphical routes as described herein. For example, the geographic area map, as described in various embodiments herein, may be provided from a remote platform.

In various embodiments, interactive animated GUI may further be configured to render (214) a plurality of geospatial graphics and/or graphical routes on a geographic area map via the display device. Geospatial graphics and/or graphical routes may be rendered, or generated, based on the GUI values received by geospatial animation app. For example, geospatial graphics and/or graphical routes may be determined based on geospatial analysis of the GUI values, where statistical, spatial, and/or and other analytic techniques are applied to the GUI position values and GUI time values. Such analysis would include geospatial animation app 201 generating and mapping geospatial graphics and/or graphical routes to a geospatial area map such that the representation of the GUI values on the geographical area map corresponds with a real-world representation of a vehicle's trip in a real-world geographic area.

The plurality of geospatial graphics and/or graphical routes may be rendered by geospatial animation app 201 and interactive animated GUIs in a variety of embodiments as described herein. For example, in some embodiments, an interactive GUI may be operable to provide scrubbed playback rendering of geospatial graphics. In other embodiments, an interactive animated GUI may be operable to provide rapid playback of multiple vehicular trips. In still further embodiments, interactive animated guided GUIs may be operable to provide geographic heat maps of multiple vehicular trips. In the various embodiments, each geospatial graphic and/or graphical route may correspond to, or be associated with, the GUI position values and respective GUI time values as received from telematics cloud platform 110.

In some embodiments, the geospatial animation app may include a geospatial graphic reduction component that determines a reduced subset of GUI position values and corresponding GUI time values from the plurality of GUI position values and the plurality of corresponding GUI time values. In such embodiments, the plurality of geospatial graphics rendered via the interactive animated GUI may be generated based on the reduced subset. For example, some embodiments, the reduced subset may be determined to include only non-redundant geospatial graphics. In other embodiments, the reduced subset may be determined to include only geospatial graphics associated with environment data or vehicle status data, as described for FIGS. 3A-C, 4A and 4B herein. In still further embodiments, the reduced subset may be determined based on a time-lapse algorithm.

In still further embodiments, interactive animated GUI may be configured to provide scrubbed playback rendering (216) of geospatial graphics. In such embodiments, the interactive animated GUI generally renders the plurality of geospatial graphics in a chronological order. As used herein, the term scrubbing or scrubbed playback rendering refers a feature that allows re-rendering (e.g., rewind/replay) of graphics or images (e.g., geospatial graphics). Such scrubbed playback rendering may require the geospatial animation app to retrieve (218) GUI values that may be used to generate and/or render the geospatial graphics for the playback rendering.

Figure 3A:
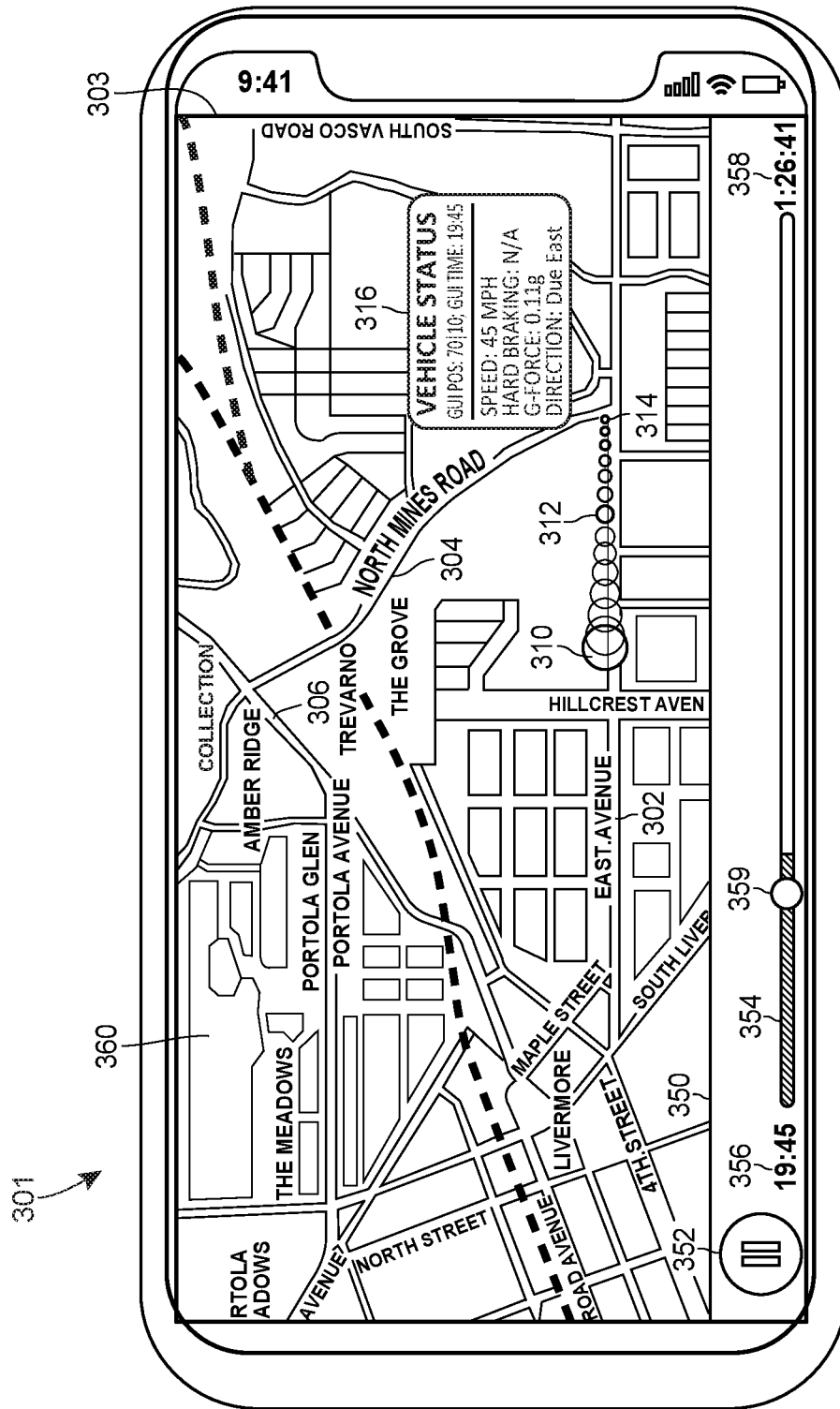
FIG. 3A illustrates an interactive animated GUI operable to provide scrubbed playback rendering of geospatial graphics in accordance with various embodiments disclosed herein.

FIG. 3A illustrates an interactive animated GUI 303 operable to provide scrubbed playback rendering of geospatial graphics 310-314 in accordance with various embodiments disclosed herein. Interactive animated GUI 303 is implemented via geospatial animation app 201. In the embodiment of FIG. 3A, interactive animated GUI 303 is implemented via display device 301, which, in some embodiments, may be a mobile device of a user. In some embodiments mobile device 301 may be mobile device 106*m* that performs functionality of telematics device 106 of FIG. 2 as described herein. It is to be understood, however, that interactive animated GUI 303 may also be implemented via other device types, e.g., a laptop implementing a web-based interactive animated GUI via a web browser, etc.

In the embodiment of FIG. 3A, interactive animated GUI 303 is configured to receive a plurality of GUI position values and a plurality of corresponding GUI time values, e.g., as described herein for FIGS. 1A and 1B, and/or FIG. 2. Interactive animated GUI 303 renders a plurality of geospatial graphics, including geospatial graphics 310-314, on a geographic area map 360 via the display device 301. Each geospatial graphic 310-314 corresponds to a GUI position value of the plurality of GUI position values. In addition, each geospatial graphic is rendered at a GUI time value corresponding to the GUI position value. Geographic area map 360 includes various graphical routes, roads, intersections, etc., including East Avenue 302, North Mines Road 304, and Amber Ridge 306. Geospatial graphics, e.g., 310-314, may be rendered on such graphical routes, roads, intersections, etc. to represent operation of a vehicle (e.g., vehicle 108) on geographic area map 360.

In the embodiment of FIG. 3A, interactive animated GUI 303 renders the plurality of geospatial graphics, including geospatial graphics 310-314, in a chronological order, e.g., based on the received GUI time values. For example, as illustrated by FIG. 3A, first geospatial graphic 310 is displayed on the geographic area map 360 at a first GUI position value at a first GUI time value. First geospatial graphic 310, as displayed on geographic area map 360, may represent a first real position and a corresponding first real time value a vehicle (e.g., vehicle 108) was located for a corresponding real-world area. Similarly, a second geospatial graphic 312 is displayed on the geographic area map 360 at a second GUI position value at a second GUI time value. Likewise, a third geospatial graphic 314 is displayed on the geographic area map 360 at a third GUI position value at a third GUI time value. Third geospatial graphic 314 may represent a current GUI position and current GUI time value being rendered via interactive animated GUI 303, which may represent the current GUI position and current GUI time value of a vehicle (e.g., vehicle 108) traveling on geographic area map 360.

As illustrated in the embodiment of FIG. 3A, first geospatial graphic 310 is rendered to have a first graphical form, and the second geospatial graphic 312 is rendered to have a second graphical form. The first graphic form (of first geospatial graphic 310) visually differs from the second graphical form (of second geospatial graphic 312) based on differences of the first GUI position value or the first GUI position time value (of first geospatial graphic 310) compared with the second GUI position value or the second GUI position time value (of second geospatial graphic 312). For example, in some embodiments, the first graphic form of first geospatial graphic 310 is rendered to visually differ from the second graphical form of first geospatial graphic 312. The visual difference may be based on differences of the first GUI position value or the first GUI position time value (of first geospatial graphic 310) compared with the second GUI position value or the second GUI position time value (of second geospatial graphic 312). In this way, the first graphical form can visually represent a first set of GUI values (e.g., the first GUI position value and the first GUI time value, each representative of a first set of vehicular telematics data) and the second graphical form can visually represent a second set of GUI values (e.g., the second GUI position value and the second GUI time value, each representative of a second set of vehicular telematics data).

As illustrated in the embodiment of FIG. 3A, the interactive animated GUI renders the first graphical form (of first geospatial graphic 310) and the second graphical form (of second geospatial graphic 312) to have a different graphical form because the first GUI position value and the first GUI position time value (of the first geospatial graphic 310) have divergent values compared with the second GUI position value and the second GUI position time value (of the second geospatial graphic 312). In particular, first geospatial graphic 310 represents an earlier GUI position value of a vehicle at an earlier GUI time value than compared with the first geospatial graphical 312. Similarly, third geospatial graphic 314 may represent a current GUI position and current GUI time value that is more recent in time than both of first geospatial graphic 310 and second geospatial graphic 312.

Thus, together the plurality of geospatial graphics, including geospatial graphics 310-314, rendered and displayed by interactive animated GUI 303 in the chronologic order on the geographic area map 360 defines an animated graphical representation of a vehicular trip. The plurality of geospatial graphics, including geospatial graphics 310-314, illustrates a portion of a vehicle trip that includes a vehicle (e.g., vehicle 108) operating on East Avenue 302 of geographic area map 306.

As further illustrated in the embodiment of FIG. 3A, interactive animated GUI 303 is operable to provide scrubbed playback rendering of the geospatial graphics, including geospatial graphics 310-314, via user interaction with the geographic area map 360. In such embodiments, scrubbed playback rendering of the geospatial graphics may be initiated by a user selecting a GUI map position value from the geographic area map, e.g., a position at or near geospatial graphic 312. In such embodiments, interactive animated GUI 303 may perform playback rendering of the geospatial graphics 310-314 in the chronological order starting from a playback geospatial graphic (e.g., geospatial graphic 312) of the plurality of geospatial graphics. In such embodiments, the playback geospatial graphic (e.g., geospatial graphic 312) may have a playback GUI position value selected from the plurality of GUI position values where the playback GUI position value corresponds to the GUI map position value. Playback may start from the playback geospatial graphic (e.g., geospatial graphic 312) and continue in the chronological order to advance to a current geospatial graphic, e.g. geospatial graphic 314. For example, a user may touch, tap, or swipe the geographic are map 360 to invoke playback rendering. In such embodiments, geospatial animation app 303 can move to certain time (e.g., time 19:45) in a time period (e.g., total time of 1:26:41) to visualize different geographic graphic images (e.g., geospatial graphics 312 and 314). For example, in some embodiments, a user may scrub playback rendering by selecting a position on the digital/electronic geographic area map, where the interactive animated GUI renders the geospatial graphic/images in the sequential order from the time value of the nearest corresponding geographic data structure to the selected position.

As further illustrated in the embodiment of FIG. 3A, interactive animated GUI 303 renders a time bar 350 corresponding to all time values of each of the GUI time values. A user may scrub playback via interaction with time bar 350. Time bar 350 may include a pause/play button 352 for stopping/starting play back rendering. Time bar 350 may further include time span indicator 354 defining a total time duration 358 (e.g., 1:26:41) associated with a vehicle trip and current time slider 359 indicating a current time 356 (e.g., 19:45) associated with a vehicle trip. Time bar 350, via current time slider 359, is operable to scrub playback rendering of the geospatial graphics, including geospatial graphics 310-314, on the geographic area map 360.

In some embodiments, scrubbed playback rendering of the geospatial graphics (e.g., geospatial graphics 310-314) via a user interacting with the geographic area map 360 causes time bar 350 (e.g., time span indicator 354 and/or current time slider 359) to be updated to represent a current GUI time, as selected by the user, from the plurality of corresponding GUI time values.

As further illustrated in the embodiment of FIG. 3A, interactive animated GUI 303, e.g., via a graphic overlay component of geospatial animation app 303, may further be configured to annotate geographic area map 360 with a graphic overlay 316. Graphic overlay 316 may also be referred to as a "popup" or "screen" herein. Graphic overlay 316 includes vehicle status data that may be determined, e.g., via a vehicle status analytics component implemented at the telematics cloud platform 110. In such embodiments, the vehicle status analytics component is configured to determine vehicle status data based on the vehicular telematics data. Vehicle status data may include any of vehicle speed, hard breaking, g-force, direction of travel, swerving, bump detected, stop detected, wreck detected, etc. For example, g-force information may be determined from one or more sensors 118 and/or telematics device 106. Graphic overlay 316 may include new information related to data generated or determined via post-processing of telematics data. Such new data may include tips or other information to the user informing the user how to avoid dangerous conditions (e.g., dangerous driving and/or road conditions, how to avoid certain routes, etc.).

In the embodiment of FIG. 3A, a vehicle representation (e.g., a representation of vehicle 108) at current geospatial graphic 314 is traveling at 45 miles-per-hour, accelerating at a rate of 0.11 g g-force, with no hard breaking detected, in a direction of travel due east. The vehicle's current GUI position is 70 (e.g., a relative x-coordinate to the display screen of the display device) and 10 (e.g., a relative y-coordinate to the display screen of the display device) at the GUI value time of 19:45, which is also illustrated via time bar 350.

Vehicle status data may be associated with a particular GUI position value. In such embodiments, geospatial animation app 201 is configured to receive the vehicle status data and associate the vehicle status data with particular geospatial graphics (e.g., geospatial graphics 310-314) corresponding to the particular GUI position value.

In some embodiments, vehicle status data may be displayed via graphic overlay 316. In such embodiments, when a user taps or hovers over a particular geospatial graphic (e.g., geospatial graphic 314) graphic overlay 316 may be displayed. In other embodiments, vehicle status data is displayed via the graphic overlay 316 at or near the same time when the interactive animated GUI renders the particular geospatial graphic (e.g., graphic overlay 316 may be displayed when interactive animated GUI 303 renders geospatial graphic 314).

Figure 3B:
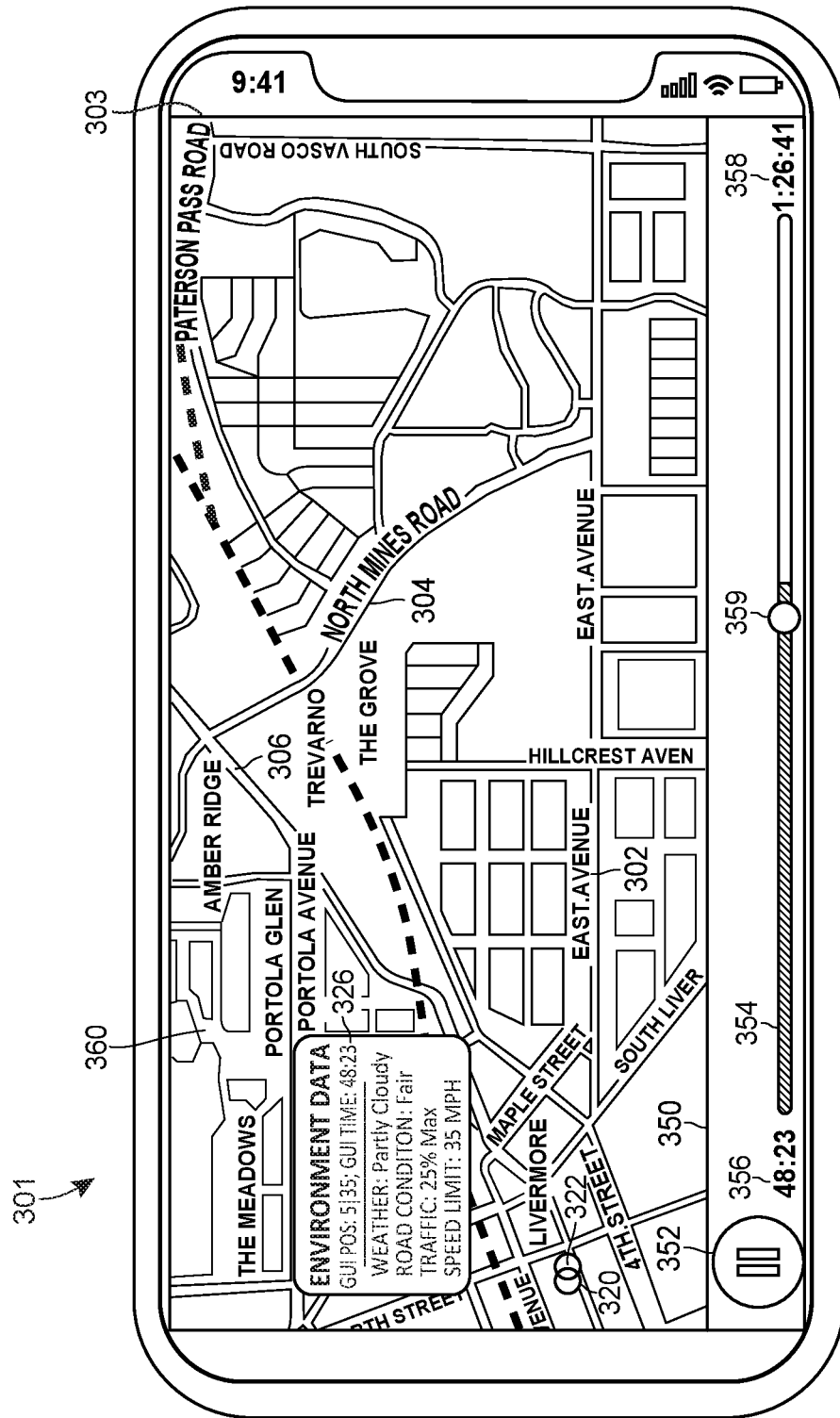
FIG. 3B illustrates the interactive animated GUI of FIG. 3A displaying a second embodiment of the geospatial graphics in accordance with various embodiments disclosed herein.

FIG. 3B illustrates the interactive animated GUI of FIG. 3A displaying a second embodiment of the geospatial graphics, including geospatial graphics 320-322, in accordance with various embodiments disclosed herein. Interactive animated GUI 303 is implemented via geospatial animation app 201. In the embodiment of FIG. 3B, interactive animated GUI 303 is implemented via display device 301, which, in some embodiments, may be a mobile device of a user. In some embodiments mobile device 301 may be mobile device 106m that performs functionality of telematics device 106 of FIGS. 1A, 1B, and FIG. 2 as described herein. It is to be understood, however, that interactive animated GUI 303 may also be implemented via other device types, e.g., a laptop implementing a web-based interactive animated GUI via a web browser, etc.

FIG. 3B includes the same or similar elements as FIG. 3B, including, for example, time bar 350, geographic area map 360 (and related routes and areas 302, 304, and 306). Accordingly, the disclosure for FIG. 3A applies the same or similarly for FIG. 3B.

In the embodiment of FIG. 3B, current time slider 359 is at current time 48:23 (356), which may represent a future GUI time value compared to the time values of geospatial graphics 310-314 of FIG. 3A. At current time 48:23, interactive animated GUI 303 displays two geospatial graphics 320 and 322. Geospatial graphics 320 and 322 are rendered similarly because they have similar GUI position values and similar GUI time value. In particular, interactive animated GUI 303 generates the first graphical form of geospatial graphic 320 and the second graphical form of geospatial graphic 322 to have a same or similar graphical form because the first GUI position value and the first GUI position time value (of geospatial graphic 320) have similar values compared with the second GUI position value and the second GUI position time value (of geospatial graphic 322).

For example, in the embodiment of FIG. 3B, geospatial graphics 320 and 322 may represent a vehicle (e.g., vehicle 108) stopped at an intersection of the geographic area map 360. Because the vehicle is stopped, geospatial graphics 320 and 322 may have the same or similar GUI position values and/or the same or similar GUI time values.

In the embodiment of FIG. 3B, graphic overlay component annotates geographic area map 360 with a graphic overlay 326 having environment data. Environment data may include weather data, road condition data, traffic data, road data (e.g., speed limit of road), etc. In some embodiments, the environment data may be received from one or more remote platforms (e.g., remote platform 112). For example, environment data may be received from various sources/remote platforms, including third party sources such as municipal APIs (e.g., bus/train schedules), private APIs (e.g., GOOGLE maps), and/or public transit data APIs.

In some embodiments, telematics cloud platform 110 is configured to receive environment data associated with a vehicular trip. The environment data may include an environment position and an environment time value of the environment position. In such embodiments, an environment data correlation component may be configured to correlate the environment data with a particular geospatial graphic (e.g., geospatial graphic 322) of the plurality of geospatial graphics. The environment position and the environment time value of the environment position of the environment data corresponds to the GUI position value and the GUI time value of the particular geospatial graphic (e.g., geospatial graphic 322) to thereby map, or associate, the environment data with the particular geospatial graphic (e.g., geospatial graphic 322).

In the embodiment of FIG. 3B, a vehicle (e.g., vehicle 108) represented at current geospatial graphic 322 experiences environment data that, in the present embodiment, includes partly cloudy weather with fair road conditions, light traffic (i.e., 25% of maximum recorded traffic for the intersection). The road the representative vehicle is traveling on has a speed limit of 35 miles per hour. The vehicle's current GUI position value comprises the values of 5 (e.g., a relative x-coordinate to the display screen of the display device) and 35 (e.g., a relative y-coordinate to the display screen of the display device) at the GUI value time of 48:23, which is also reflected in time bar 350.

In some embodiments, the environment data is displayed via graphic overlay 326 when a user taps or hovers over the geospatial graphic 322. In other embodiments, the environment data is displayed via graphic overlay 326 when interactive animated GUI 303 renders geospatial graphic 322.

Figure 3C:
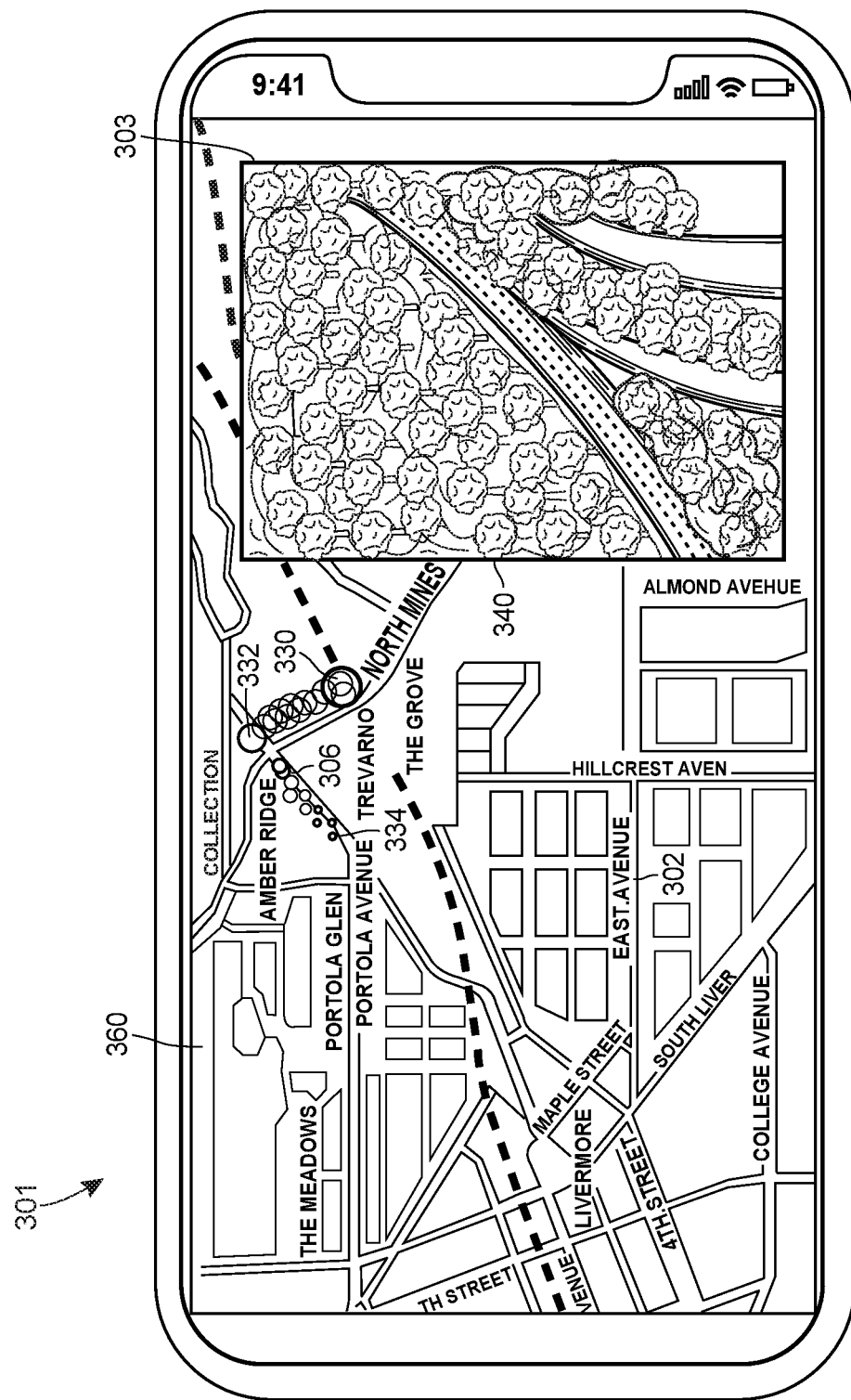
FIG. 3C illustrates the interactive animated GUI of FIG. 3A rendered with a three-dimensional (3D) image in accordance with various embodiments disclosed herein.

FIG. 3C illustrates the interactive animated GUI 303 of FIG. 3A rendered with a three-dimensional (3D) image in accordance with various embodiments disclosed herein. Interactive animated GUI 303 is implemented via geospatial animation app 201. In the embodiment of FIG. 3C, interactive animated GUI 303 is implemented via display device 301, which, in some embodiments, may be a mobile device of a user. In some embodiments, mobile device 301 may be mobile device 106m that performs functionality of telematics device 106 of FIG. 2 as described herein. It is to be understood, however, that interactive animated GUI 303 may also be implemented via other device types, e.g., a laptop implementing a web-based interactive animated GUI via a web browser, etc.

FIG. 3C includes the same or similar elements as FIG. 3A, including, for example, geographic area map 360 (and related routes and areas 302 and 306). Accordingly, disclosure for FIG. 3A applies the same or similarly for FIG. 3C.

In the embodiment of FIG. 3C, interactive animated GUI 303 renders a plurality of geospatial graphics, including geospatial graphics 330-334. In particular, geospatial graphic 330 may represent the first displayed geospatial graphic (having a first GUI position value and corresponding first GUI time value) of a representative vehicle (e.g., vehicle 108), where the vehicle turns a corner at the time and position represented by geospatial graphic 332 (e.g., a second GUI position value and corresponding second GUI time value), and where the vehicle continues on a current route as represented by geospatial graphic 334 (e.g., having a third GUI position value and corresponding third GUI time value).

In the embodiment of FIG. 3C, the plurality of geospatial graphics, including geospatial graphics 330-334, are rendered as a plurality of two-dimensional (2D) geospatial graphics. In addition, geospatial animation app 201 is configured to receive a plurality of three-dimensional (3D) images that correspond to the plurality of 2D geospatial graphics, including geospatial graphics 330-334. In some embodiments the three-dimensional (3D) images correspond to the plurality of 2D geospatial graphics such that a time value of a 3D image is the same or similar to the GUI time value of a respective 2D geospatial graphic. For example, in some embodiments, interactive animated GUI 330 may render, on the display device, the plurality of 3D images with the plurality of 2D geospatial graphics during an animated graphical representation of one or more of vehicle trips. In this way, a user may visualize a vehicle trip in both 2D and 3D with the 2D geospatial graphics rendered alongside the 3D images.

As described, interactive animated GUI 330 may render one or more of the 3D images on the display device with the plurality of 2D geospatial graphics. For example, in the embodiment of FIG. 3C, 3D image 340 is rendered that corresponds to 2D geospatial graphic 330. In the particular example, 3D image 340 shows a 3D representation of the upcoming corner or turn as represented by the path from 2D geospatial graphic 330 to 2D geospatial graphic 332.

In some embodiments, 3D images may be graphics, such as artistic renderings of a 3D environment. In other embodiments, the 3D images may be photo-realistic images, such as images taken of a real-world environment with a camera.

In some embodiments, 3D images are accessed from a remote platform (e.g., remote platform 112). Remote platforms may include, e.g., GOOGLE maps, etc.

Figure 4A:
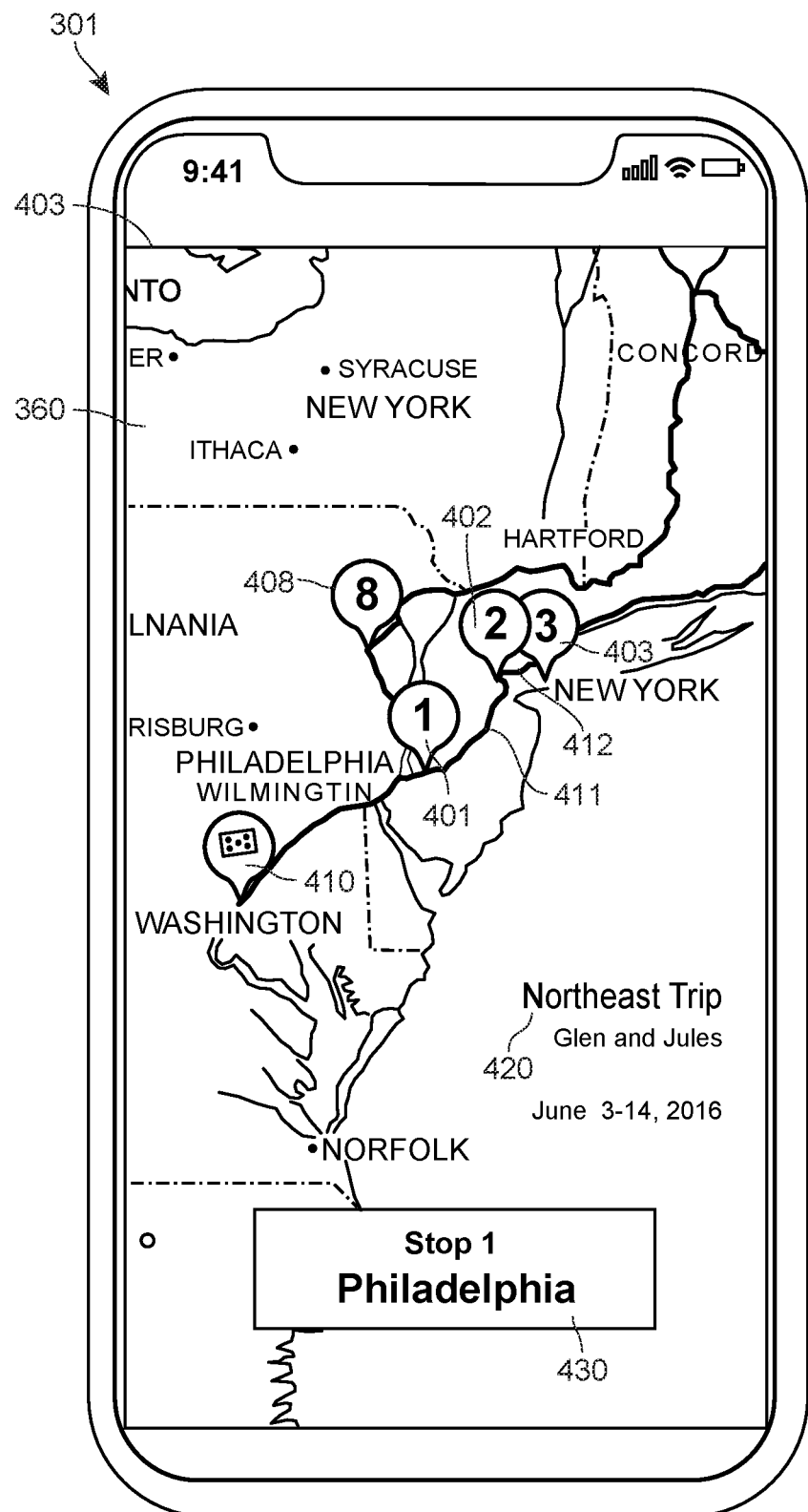
FIG. 4A illustrates an interactive animated GUI operable to provide rapid playback of multiple vehicular trips in accordance with various embodiments disclosed herein.

FIG. 4A illustrates an interactive animated GUI 403 operable to provide rapid playback of multiple vehicular trips in accordance with various embodiments disclosed herein. Interactive animated GUI 403 is implemented via geospatial animation app 201. In the embodiment of FIG. 4A, interactive animated GUI 403 is implemented via display device 301, which, in some embodiments, may be a mobile device of a user. In some embodiments mobile device 301 may be mobile device 106m that performs functionality of telematics device 106 of FIGS. 1A, 1B and/or FIG. 2 as described herein. It is to be understood, however, that interactive animated GUI 403 may also be implemented via other device types, e.g., a laptop implementing a web-based interactive animated GUI via a web browser, etc.

In the embodiment of FIG. 4A, interactive animated GUI 403 renders a geographic area map 360 and graphical routes, including graphical routes 411 and 412, based on vehicular telematics data defining a plurality of vehicle trips of a vehicle (e.g., vehicle 108) that occurred during a defined time period (e.g., a given month). The vehicular telematics data may define an original, or first, time duration, e.g., a month's worth of data for a given vehicle.

FIG. 4A represents a zoomed-out embodiment of FIG. 3A. Accordingly, the disclosure for FIG. 3A applies the same or similarly for FIG. 4A. In the embodiment of FIG. 4A, a plurality of vehicle trips is displayed, with each vehicle trip delineated by geographic stop destinations (e.g., geographic stop designations 401, 402, 403, and 408). Geographic stop destinations may be associated with particular cities, areas or otherwise locations. Geographic stop designations may also be designated with graphic popups, e.g., with geographic stop designations 401, 402, 403, and 408 as illustrated by FIG. 4A. Graphic overlays may be shown for certain graphic popups. For example, geographic stop destination 401 may be a first stop associated with the city of Philadelphia as shown by graphic overlay 430. Graphical routes may be rendered between geographic stop destinations. For example, graphical routes 411 and 412 are rendered between geographic stop destinations 401 and 402, and 402 and 403, respectively. Accordingly, as shown via FIG. 4A, one or more vehicle trips, as defined by graphical routes 411 and 412, may correspond to one or more geographic stop destination(s), e.g., geographic stop destinations 401 and 402, and 402 and 403, respectively. Interactive animated GUI 403 is configured to render one or more graphic popups on geographic area map 403 at a GUI position value associated with the geographic stop destinations.

In the embodiment of FIG. 4A, geospatial animation app 403 is configured to receive a plurality of GUI position values and a plurality of corresponding GUI time values, e.g., as described for FIGS. 1A, 1B, and/or FIG. 2. Interactive animated GUI 403 renders a plurality of geospatial graphics, including geospatial graphics of graphical routes 411 and 412, on a geographic area map via the display device. Each geospatial graphic corresponds to a GUI position value of the plurality of GUI position values. Each geospatial graphic rendered at a GUI time value corresponds to the GUI position value.

In some embodiments of FIG. 4A, interactive animated GUI 403 renders the plurality of geospatial graphics in a chronological order. For example, a first geospatial graphic may be displayed on geographic area map 360 at a first GUI position value at a first GUI time value. Similarly, a second geospatial graphic may be displayed on geographic area map 360 at the second GUI position value at the second GUI time value. For example, the first geospatial graphic and the second geospatial graphic may be part of graphical routes 411 and/or 412. In certain embodiments, as for FIG. 3A, the first geospatial graphic may be rendered to have a first graphical form and the second geospatial graphic may be rendered to have a second graphical form. The first graphic form may visually differ from (or be visually similar to) the second graphical form based on differences (or similarities) of the first GUI position value or the first GUI position time value compared with the second GUI position value or the second GUI position time value.

In the embodiment of FIG. 4A, interactive animated GUI 403 renders the plurality of geospatial graphics in a chronologic order on the geographic area map 360. Such chronological rendering defines an animated graphical representation of each of the plurality of vehicle trips defined by each of the graphic popups of geographic stop destinations, including, for example, 401 and 402, and 402 and 403, for graphical routes 411 and 412, respectively. In several embodiments, the animated graphical representation displayed over a second time duration that is generally shorter than the original time duration. For example, if the original, or first time duration, was a month, then the animated graphical representation may be reduced to 5 minutes of rendering to represent a months' worth of vehicle driving during the shorter 5 minute duration. The reduction from one month to 5 minutes of playback time may be accomplished by rapidly displaying geospatial graphics and/or reducing or filtering the number of geospatial graphics displayed based on various techniques described herein (e.g., time-lapsing, etc.). In any event, in such embodiments, rapid or reduced rendering may constitute a rapid playback of a user's driving for a months' time.

For certain embodiments of FIG. 4A, for, geospatial animation app 201 may be further configured to display, via interactive animated GUI 403, a trip summary screen (not shown). The trip summary screen may be configured to display a graphical representation of each of the plurality of vehicle trips, such as shown by any of FIGS. 3A-3C. Geospatial animation app 201 may be further configured to receive a user selection to display a single graphical representation of the plurality of vehicle trips, where a graphical representation of each of the plurality of vehicle trips, such as shown by any of FIGS. 3A-3C, is rendered continuously via rapid playback.

Figure 4B:
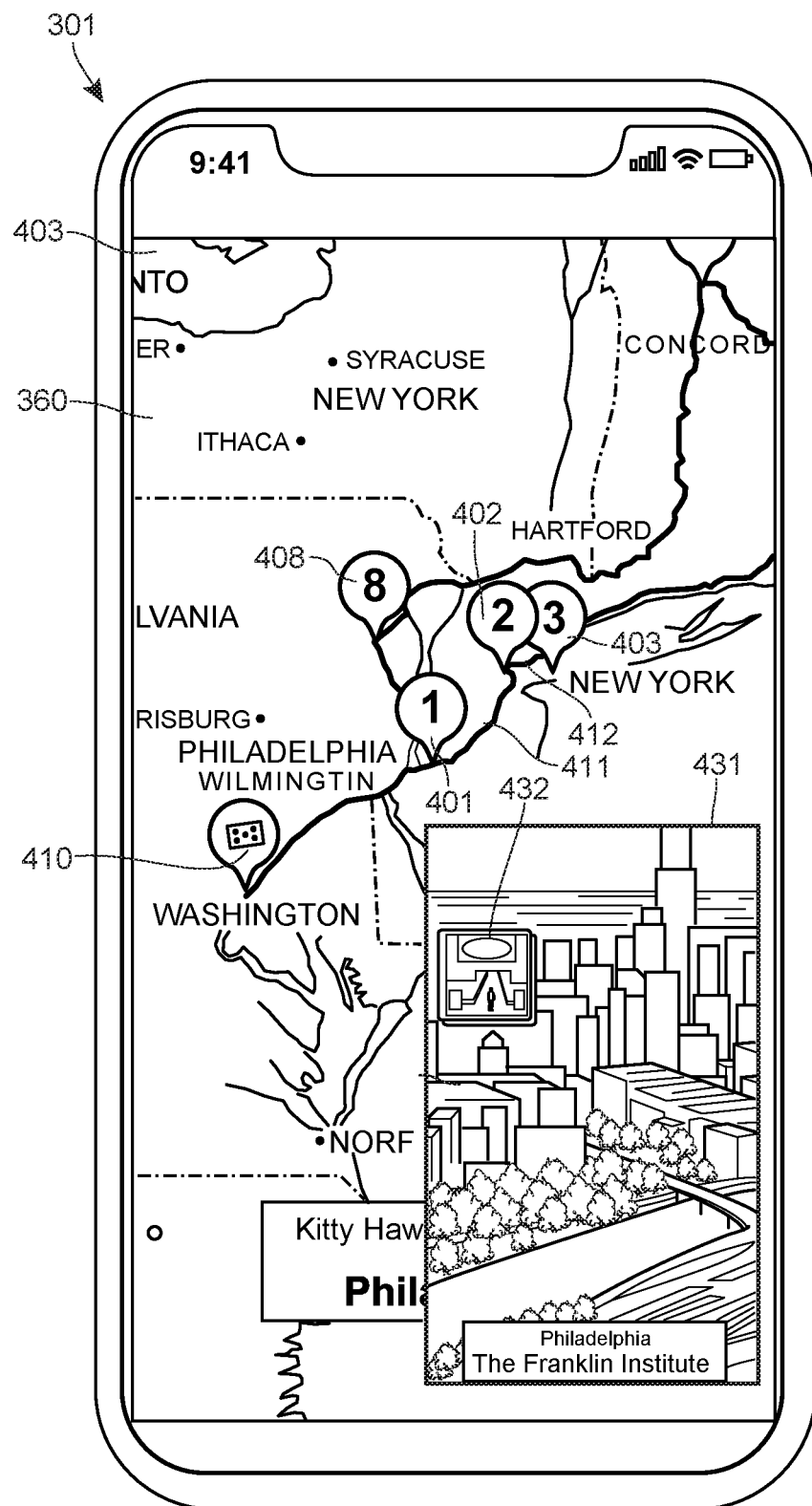
FIG. 4B illustrates the interactive animated GUI of FIG. 4A rendered with a 3D image in accordance with various embodiments disclosed herein.

FIG. 4B illustrates the interactive animated GUI of FIG. 4A rendered with a 3D image in accordance with various embodiments disclosed herein. Interactive animated GUI 403 is implemented via geospatial animation app 201. In the embodiment of FIG. 4B, interactive animated GUI 403 is implemented via display device 301, which, in some embodiments, may be a mobile device of a user. In some embodiments mobile device 301 may be mobile device 106*m* that performs functionality of telematics device 106 of FIG. 2 as described herein. It is to be understood, however, that interactive animated GUI 403 may also be implemented via other device types, e.g., a laptop implementing a web-based interactive animated GUI via a web browser, etc.

In the embodiment of FIG. 4B, 3D image 431 is displayed for a current GUI position value of a current geospatial graphic (not shown) rendered for the respective current GUI position time value. For example, 3D image 431 may be displayed when the current GUI position value is at or near geographic stop destination 401 (e.g., Philadelphia), such that 3D image 431 displays a 3D image of downtown Philadelphia. 3D image 431 is rendered using the same or similar techniques as described for FIG. 3C, such that the disclosure of FIG. 3C applies equally or similarly for FIG. 4B.

In some embodiments, as illustrated by FIG. 4B, a selection of a graphic popup (e.g., graphic popup of geographic stop destination 401) may cause the interactive animated GUI to render one or more photographs 432 associated with the geographic stop destination (e.g., geographic stop destination 401). Photographs 432 may include photographs that users took of the particular geographic stop destination (e.g., photographs of downtown Philadelphia for geographic stop destination 401).

Figure 5:
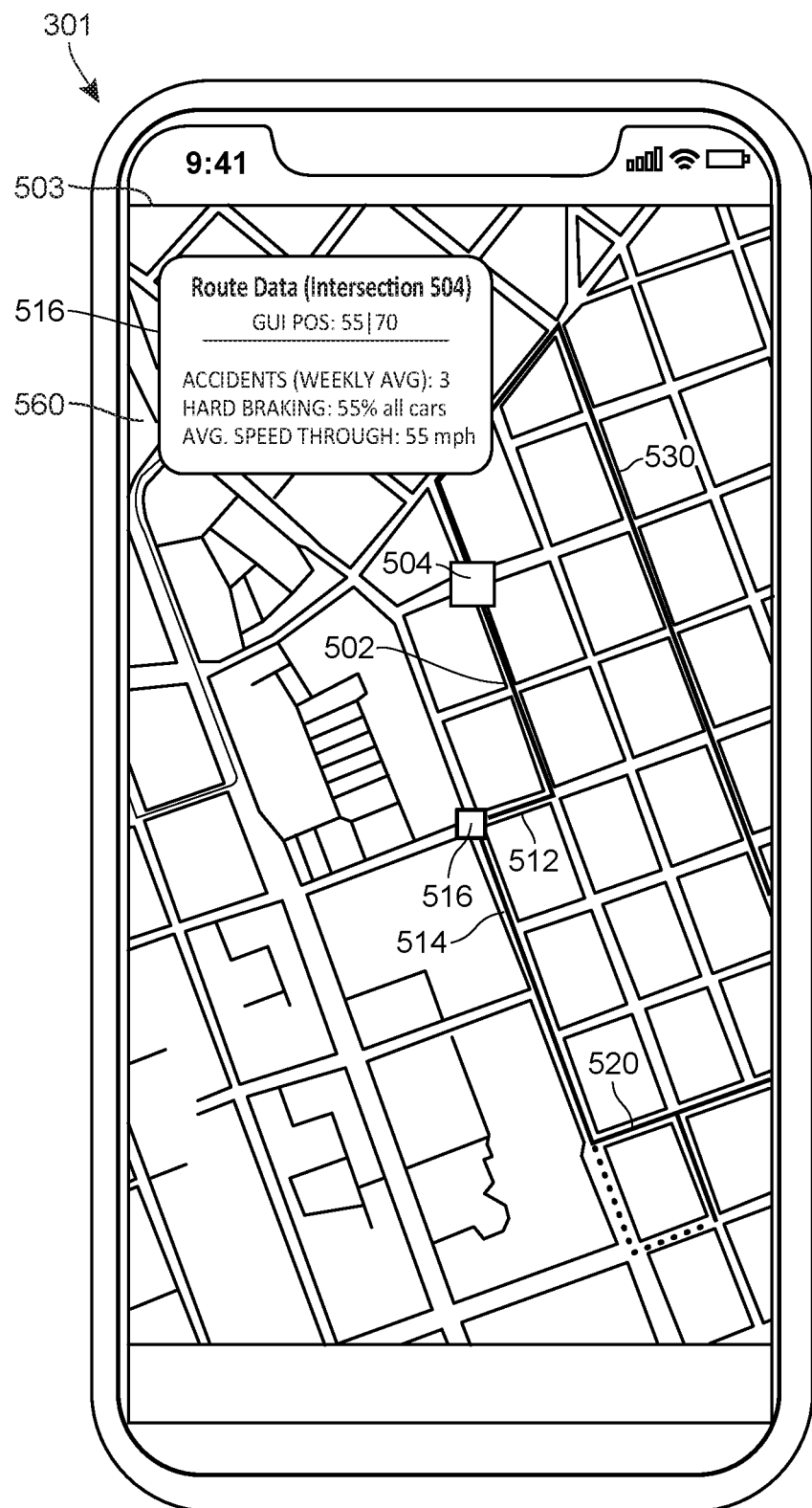
FIG. 5 illustrates an interactive animated GUI operable to provide geographic heat maps of multiple vehicular trips in accordance with various embodiments disclosed herein.

FIG. 5 illustrates an interactive animated GUI operable to provide geographic heat maps (e.g., geographic heat map 560) of multiple vehicular trips in accordance with various embodiments disclosed herein. In the embodiment of FIG. 5, vehicular telematics data defining a plurality of vehicle trips of a vehicle (e.g., vehicle 108) navigating actual routes within a certain geographic area may be received at telematics cloud platform 110. Such vehicular telematics data may be used to generate related GUI values as described herein.

In the embodiment of FIG. 5, interactive animated GUI 503 is implemented via display device 301, which, in some embodiments, may be a mobile device of a user. Interactive animated GUI 503 is implemented via geospatial animation app 201. In some embodiments mobile device 301 may be mobile device 106m that performs functionality of telematics device 106 of FIG. 2 as described herein. It is to be understood, however, that interactive animated GUI 503 may also be implemented via other device types, e.g., a laptop implementing a web-based interactive animated GUI via a web browser, etc.

In the embodiment of FIG. 5, interactive animated GUI 503 is configured to receive a plurality of GUI position values and a plurality of corresponding GUI time values, e.g., as described for FIGS. 1A, 1B, and/or FIG. 2. Interactive animated GUI 503 is further configured to render a plurality of graphical routes, including graphical routes 502, 512, 514, 520, and 530, on a geographic heat map 560 via the display device. In various embodiments, geographic heat map 560 may be a geographic area map, as described for FIGS. 3A-3C and 4A and 4B, but where geographic heat map 560 also includes graphical routes that visually represent frequency of travel, speed, and/or other vehicular data as described herein. For example, in some embodiments, each of the graphical routes (e.g., graphical routes 502, 512, 514, 520, and 530) may be rendered with a weight or a color determined from the plurality of GUI position values and the plurality of corresponding GUI time values. In such embodiments, the weight or the color of each graphical route (e.g., any of graphical routes 502, 512, 514, 520, and 530) may visually represent a quantity of the plurality of GUI position values and the plurality of corresponding GUI time values as associated with the graphical route. For example, in an embodiment where graphical route 502 were associated with a greater quantity of GUI position values and GUI time values than graphical route 520, then graphical route 502 may be rendered via a heavier weight (e.g., 2 pixel or point thickness) and/or more conspicuous color (e.g., red) compared with graphical route 520 (e.g., 1 pixel or point thickness and a white color). Thus, one color may represent a greater velocity than another color. Such rendering provides a visual of graphical routes that are more (or less) traveled, and, when rendered together, comprise a geographic heat map, such as geographic heat map 560 as illustrated in FIG. 5.

For example, in an embodiment of FIG. 5, a first graphical route (e.g., graphical route 502) may be displayed on geographic heat map 560 that represents a first set of GUI position values and a first set of corresponding GUI time values. Similarly, a second graphical route (e.g., graphical route 520) may be displayed on geographic heat map 560 that represents a second set of GUI position values and a second set of corresponding GUI time values. As illustrated in FIG. 5, the first graphical route (e.g., graphical route 502) may be rendered to have a first weight or a first color, and the second graphical route graphical route 520 may be rendered to have a second weight or a second color. As illustrated in FIG. 5, the first weight or the first color can visually differ from the second weight or the second color. Such difference may be based on differences of a first quantity of GUI values of the first set of GUI position values and the first set of corresponding GUI time values (e.g., of graphical route 502) compared with a second quantity of GUI values of the second set of GUI position values and the second set of corresponding GUI time values (e.g., of graphical route 520).

In the embodiment of FIG. 5, the act of interactive animated GUI 503 rendering the plurality of graphical routes (e.g., graphical routes 502, 512, 514, 520, and 530) on the geographic area map of FIG. 5 defines geographic heat map 560. Such rendering represents of each of the plurality of vehicle trips a vehicle (e.g., vehicle 108) traveled within the geographic area represented by geographic heat map 560. In addition, geographic heat map 560 visually represents a frequency of travel of the actual routes within the geographic area.

In some embodiments associated with FIG. 5, the color of a particular graphical route (e.g., graphical route 502) may represent a velocity associated with the particular graphical route. For example, the velocity may be determined from a plurality of corresponding GUI time values associated with the particular graphical route. In such embodiments, analysis of GUI time values, e.g., by geospatial animation app, may determine that the particular graphical route is associated with vehicles (e.g., vehicle 108) traveling at high velocities.

In additional embodiments associated with FIG. 5, geospatial animation app 201 may include a graphic overlay component (not shown). Graphic overly component may be configured to annotate the geographic area map with route data. Route data may include accident related data and/or other risk factors that can be overlaid geographic heat map 560 to communicate different segments of risk. For example, as illustrated in FIG. 5, route data may be displayed in graphic overlay 516. Graphic overlay 516 includes route data associated with intersection 504 of geographic heat map 560. Intersection 504 is an intersection of two graphical routes of geographic heat map 560.

In the embodiment of FIG. 5, the graphic overly component annotates the graphical routes forming intersection 504 with route data. Route data may be determined by telematics cloud platform 110 based on the vehicle telematics data and/or by geospatial animation app 201 based on GUI values. In some embodiments, route data may be transmitted to geospatial animation app 201 along with the GUI values. In the embodiment of FIG. 5, route data may include accident data associated with the one or more of the plurality of graphical routes, e.g., such as intersection 504. In addition, route data may include risk data associated with the one or more of the plurality of graphical routes, e.g., such as intersection 504. Such risk data may include speeding information regarding speeds that typically occur along a given graphical route, e.g., graphical route 502. In particular, as illustrated via overlay 516, route data pertains to intersection 504. Intersection 504's GUI position value comprises 55 (e.g., a relative x-coordinate to the display screen of the display device) and 70 (e.g., a relative y-coordinate to the display screen of the display device). The route data of graphic overlay 516 includes that intersection 504 experiences an average of 3 vehicular accidents per week, that 55 percent of all cars perform hard breaking at intersection 504, and that the average speed of vehicles through intersection 504 is 55 miles-per-hour.

Figure 6:
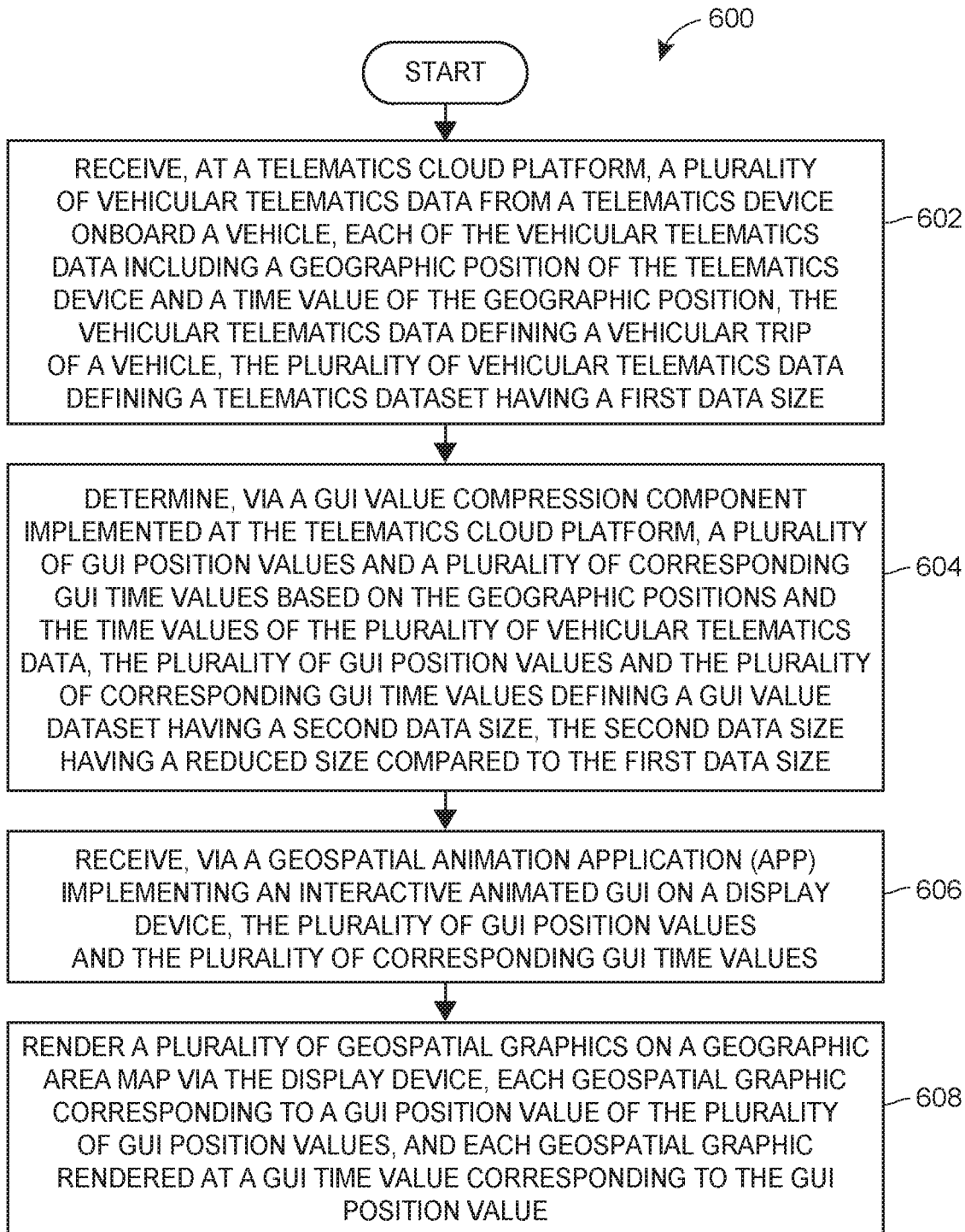
FIG. 6 illustrates a flow diagram of an exemplary telematics method for generating interactive animated GUIs operable to provide scrubbed playback rendering of geospatial graphics in accordance with various embodiments disclosed herein.

As illustrated in FIG. 5, intersection 504 may be determined as a high risk intersection and/or graphical route such that intersection 504 is visually represented on FIG. 5 with a large intersection graphic, which may be rendered larger than a lower risk intersection (e.g., intersection 516). A larger rendering may visually represent a higher risk intersection or graphical route. Accordingly, one or more of the plurality of graphical routes of geographic heat map 560 may comprise an intersection. The geographic heat map 560 may be annotated to represent a risk level associated with the intersection FIG. 6 illustrates a flow diagram of an exemplary telematics method 600 for generating interactive animated GUIs operable to provide scrubbed playback rendering of geospatial graphics in accordance with various embodiments disclosed herein. Telematics method 600 begins (600) at block 602, where a telematics cloud platform (e.g., telematics cloud platform 110) receives vehicular telematics data from a telematics device (e.g., telematics device 106) onboard a vehicle (e.g., vehicle 108). Each record of the vehicular telematics data may include a geographic position of the telematics device (e.g., telematics device 106) and a time value of the geographic position. The vehicular telematics data may define a vehicular trip of a vehicle (e.g., vehicle 108). In addition, the vehicular telematics data may define a telematics dataset having a first data size (e.g., several megabytes of data).

At block 604, the telematics cloud platform (e.g., telematics cloud platform 110) may determine, via a GUI value compression component, a plurality of GUI position values and a plurality of corresponding GUI time values based on the geographic positions and the time values of the vehicular telematics data. The plurality of GUI position values and the plurality of corresponding GUI time values may define a GUI value dataset having a second data size that has a reduced size (e.g., several kilobytes of data) compared to the first data size. In various embodiments, the plurality of GUI position values and the plurality of corresponding GUI time values include at least (1) a first GUI position value and a first GUI time value, and (2) a second GUI position value and a second GUI time value.

At block 606, a geospatial animation app (e.g., geospatial animation app 201) implementing an interactive animated GUI on a display device receives the plurality of GUI position values and the plurality of corresponding GUI time values from the telematics cloud platform (e.g., telematics cloud platform 110).

At block 608, the geospatial animation app (e.g., geospatial animation app 201) implementing the interactive animated GUI renders a plurality of geospatial graphics (e.g., geospatial graphics 310-314 of FIG. 3A, geospatial graphics 320-322 of FIG. 3B, graphical routes of FIGS. 4A and 4B, etc.) on a geographic area map (e.g., geographic area map 360) via the display device. As described herein, each geospatial graphic may correspond to a GUI position value of the plurality of GUI position values, and each geospatial graphic rendered at a GUI time value corresponding to the GUI position value.

In additional various embodiments, the interactive animated GUI (e.g., interactive animated GUI 303 or 403) may render the plurality of geospatial graphics (e.g., geospatial graphics 310-314 of FIG. 3A, geospatial graphics 320-322 of FIG. 3B, etc.) in a chronological order. In such embodiments, a first geospatial graphic (e.g., geospatial graphic 310) may be displayed on the geographic area map (e.g., geographic area map 360) at the first GUI position value at the first GUI time value. Similarly, in such embodiments, a second geospatial graphic (e.g., geospatial graphic 312) may be displayed on the geographic area map at the second GUI position value at the second GUI time value. In still further embodiments, the first geospatial graphic (e.g., geospatial graphic 310) may be rendered to have a first graphical form, and the second geospatial graphic rendered to have a second graphical form (e.g., geospatial graphic 312). The first graphic form may be rendered via the interactive animated GUI (e.g., interactive animated GUI 303 or 403) to be visually different from (or similar to) the second graphical form based on differences (or similarities) of the first GUI position value or the first GUI position time value compared with the second GUI position value or the second GUI position time value.

In the embodiment of FIG. 6, the interactive animated GUI rendering the plurality of geospatial graphics in the chronologic order on the geographic area map (e.g., geographic area map 360) defines an animated graphical representation of the vehicular trip.

Still further, in the embodiment of FIG. 6, interactive animated GUI is operable to provide scrubbed playback rendering of the geospatial graphics (e.g., geospatial graphics 310-314 of FIG. 3A, geospatial graphics 320-322 of FIG. 3B, graphical routes of FIGS. 4A and 4B, etc.) via user interaction with the geographic area map (e.g., geographic area map 360).

Figure 7:
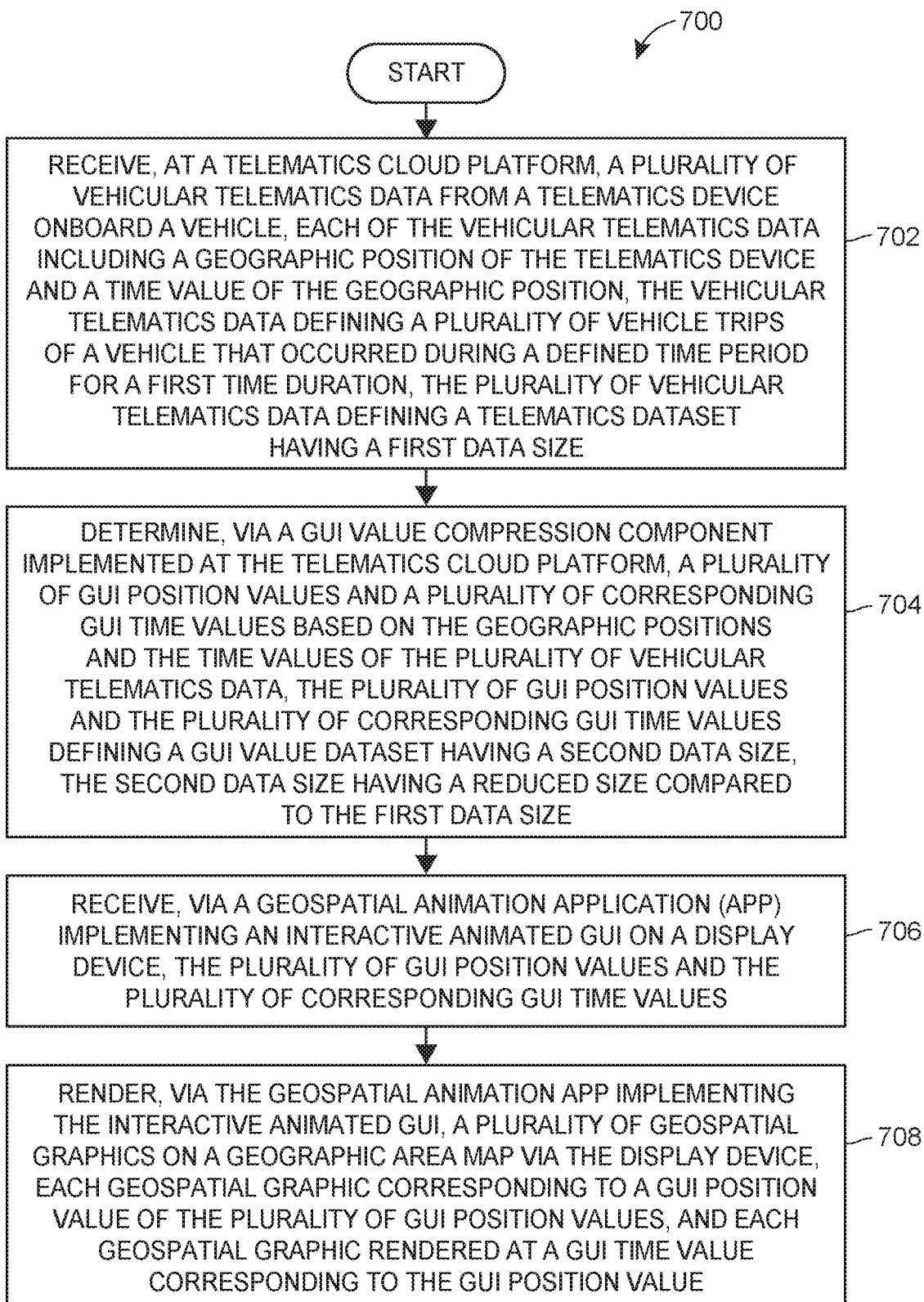
FIG. 7 illustrates a flow diagram of an exemplary vehicular telematics method for generating interactive animated GUIs operable to provide rapid playback of multiple vehicular trips in accordance with various embodiments disclosed herein.

FIG. 7 illustrates a flow diagram of an exemplary vehicular telematics method 700 for generating interactive animated GUIs operable to provide rapid playback of multiple vehicular trips in accordance with various embodiments disclosed herein. At block 702 a telematics cloud platform (e.g., telematics cloud platform 110) receives vehicular telematics data from a telematics device (e.g., telematics device 106) onboard a vehicle. Each record of the vehicular telematics data may include a geographic position of the telematics device and a time value of the geographic position. The vehicular telematics data may also define a plurality of vehicle trips of a vehicle (e.g., vehicle 108) that occurred during a defined time period (e.g., a month) for a first time duration (e.g., a month's time duration). In addition, the vehicular telematics data may define a telematics dataset having a first data size (e.g., several megabytes of data). In some embodiments, the defined time period is a configurable time period. And, in certain embodiments, the configurable time period may be configured or changed to a second time duration (e.g., shorter time duration), which causes rapid playback of geospatial graphics as described.

At block 704, a GUI value compression component implemented at the telematics cloud platform (e.g., telematics cloud platform 110) may determine a plurality of GUI position values and a plurality of corresponding GUI time values based on the geographic positions and the time values of the vehicular telematics data. The plurality of GUI position values and the plurality of corresponding GUI time values may define a GUI value dataset having a second data size having a reduced size (e.g., several kilobytes of data) compared to the first data size. In some embodiments, the plurality of GUI position values and the plurality of corresponding GUI time values may include at least (1) a first GUI position value and a first GUI time value, and (2) a second GUI position value and a second GUI time value.

At block 706 a geospatial animation app (e.g., geospatial animation app 201) implementing an interactive animated GUI on a display device receives the plurality of GUI position values and the plurality of corresponding GUI time values.

At block 708 the geospatial animation app (e.g., geospatial animation app 201) implementing the interactive animated GUI renders a plurality of geospatial graphics (e.g., geospatial graphics 310-314 of FIG. 3A, geospatial graphics 320-322 of FIG. 3B, graphical routes of FIGS. 4A and 4B, etc.) on a geographic area map (e.g., geographic area map 360) via the display device. Each geospatial graphic corresponds to a GUI position value of the plurality of GUI position values, and each geospatial graphic rendered at a GUI time value corresponding to the GUI position value.

In some embodiments, the interactive animated GUI (e.g., interactive animated GUI 303 or 403) renders the plurality of geospatial graphics (e.g., geospatial graphics 310-314 of FIG. 3A, geospatial graphics 320-322 of FIG. 3B, graphical routes of FIGS. 4A and 4B, etc.) in a chronological order. In such embodiments, a first geospatial graphic (e.g., geospatial graphic 320) may be displayed on the geographic area map at the first GUI position value at the first GUI time value. Similarly, a second geospatial graphic (e.g., geospatial graphic 322) may be displayed on the geographic area map at the second GUI position value at the second GUI time value. In such embodiments, the first geospatial graphic (e.g., geospatial graphic 320) may be rendered to have a first graphical form, and the second geospatial graphic (e.g., geospatial graphic 322) may be rendered to have a second graphical form. The first graphic form may be rendered via the interactive animated GUI (e.g., interactive animated GUI 303 or 403) to visually differ from (or be similar to) the second graphical form based on differences (or similarities) of the first GUI position value or the first GUI position time value compared with the second GUI position value or the second GUI position time value.

In the embodiment of FIG. 7, the interactive animated GUI rendering the plurality of geospatial graphics in the chronologic order on the geographic area map (e.g., geographic area map 360) defines an animated graphical representation of each of the plurality of vehicle trips. The animated graphical representation may be displayed over a second time duration having time duration shorter than the first time duration. For example, if the first time duration is a month of time, then the second duration may be 5 minutes (or some other shorter unit) of time. Therefore the interactive animated GUI may render GUI values, representative of telematics data, at rates or using techniques that greatly increase the efficiency of reviewing vehicular telematics data.

In some embodiments, for example, the plurality of geospatial graphics may be rendered at an accelerated rate compared with a real-time rate. The real-time rate may be determined, for example, from the plurality of corresponding GUI time values, where the GUI time values are determined from the real-time values of the vehicular telematics data structures as described herein. In additional embodiments, the accelerated rate may be determined based on a selected duration defining the second time duration. For example, the selected duration may be user selected duration. When the selected duration is determined, the geospatial animation app 201 may compress rendering time, e.g., compress 30 minutes of real-time vehicle telematics data into 5 minutes of rendering time for geospatial graphics using any one or more of the techniques as described herein. In such embodiments, the user may select a lower bound (e.g., not less than one second), for example, to retain a fidelity level of the original vehicle trip.

Figure 8:
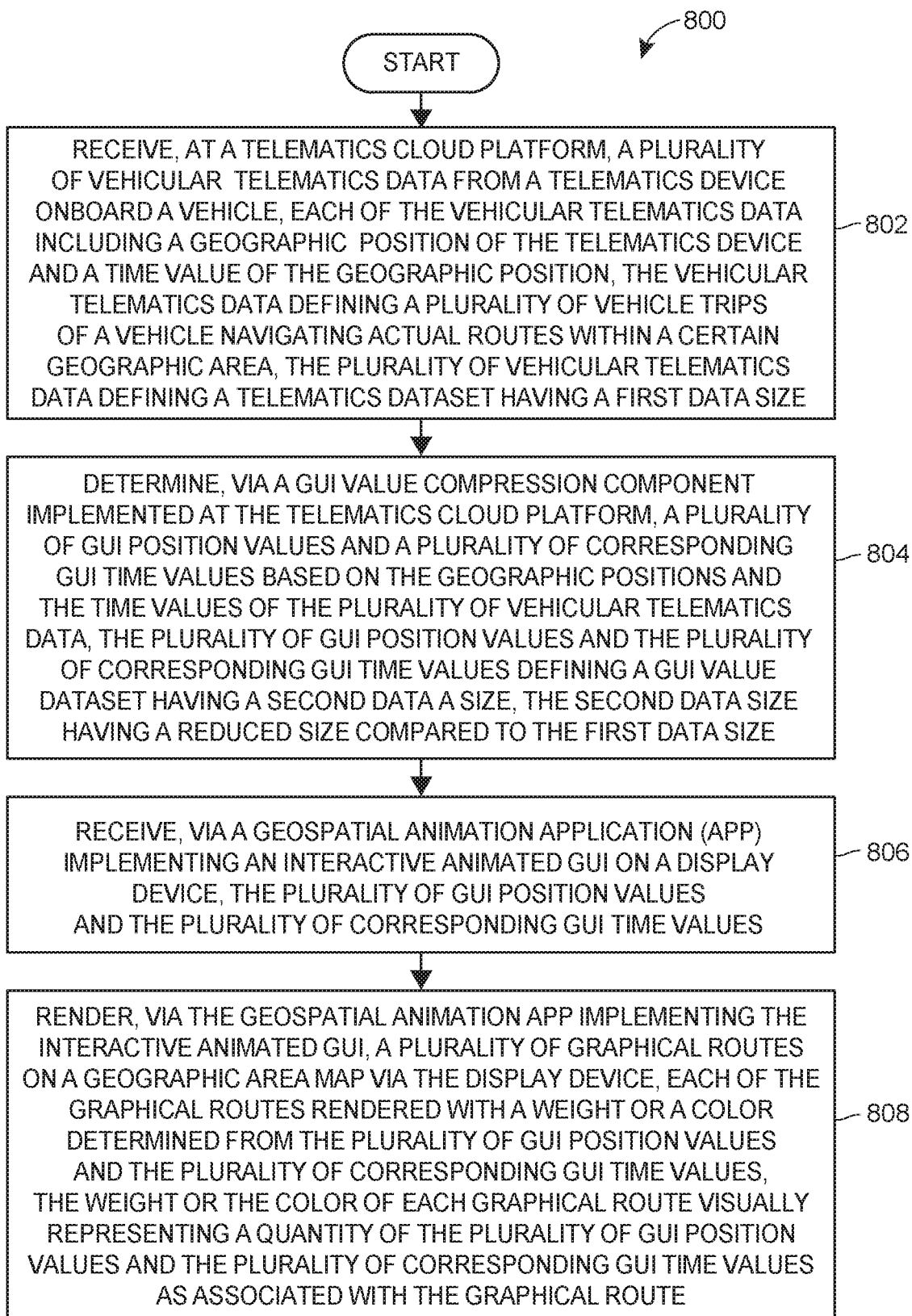
FIG. 8 illustrates a flow diagram of an exemplary vehicular telematics method for generating interactive animated GUIs operable to provide geographic heat maps of multiple vehicular trips in accordance with various embodiments disclosed herein.

FIG. 8 illustrates a flow diagram of an exemplary vehicular telematics method 800 for generating interactive animated GUIs operable to provide geographic heat maps (e.g., geographic heat map 560) of multiple vehicular trips in accordance with various embodiments disclosed herein. At block 802 a telematics cloud platform (e.g., telematics cloud platform 110) receives vehicular telematics data from a telematics device (e.g., telematics device 106) onboard a vehicle (e.g., vehicle 108). Each record of the vehicular telematics data may include a geographic position of the telematics device (e.g., telematics device 106) and a time value of the geographic position. In the embodiment of FIG. 8, the vehicular telematics data may define a plurality of vehicle trips of a vehicle (e.g., vehicle 108) navigating actual routes within a certain geographic area. In addition, the vehicular telematics data may define a telematics dataset having a first data size (e.g., several megabytes of data).

At block 804 a GUI value compression component implemented at the telematics cloud platform determines a plurality of GUI position values and a plurality of corresponding GUI time values based on the geographic positions and the time values of the vehicular telematics data. The plurality of GUI position values and the plurality of corresponding GUI time values may define a GUI value dataset having a second data size having a reduced size (e.g., several kilobytes of data) compared to the first data size. In some embodiments, the plurality of GUI position values and the plurality of corresponding GUI time values include at least (1) a first set of GUI position values and a first set of corresponding GUI time values, and (2) a second set of GUI position values and a second set of corresponding GUI time values.

At block 806 a geospatial animation app (e.g., geospatial animation app 201), implementing an interactive animated GUI (e.g., interactive animated GUI 503) on a display device, receives plurality of GUI position values and the plurality of corresponding GUI time values.

At block 808, the geospatial animation app (e.g., geospatial animation app 201) implementing the interactive animated GUI (e.g., interactive animated GUI 503) renders a plurality of graphical routes (e.g., graphical routes 502, 512, 514, 520, and 530) on a geographic area map (e.g., geographic heat map 560) via the display device. Each of the graphical routes (e.g., graphical routes 502, 512, 514, 520, and 530) are rendered with a weight or a color determined from the plurality of GUI position values and the plurality of corresponding GUI time values. The weight or the color of each graphical route is rendered to visually represent a quantity of the plurality of GUI position values and the plurality of corresponding GUI time values as associated with the graphical route. For example, in the embodiment of FIG. 8, and with reference to FIG. 5, a first graphical route (e.g., graphical route 502) may be displayed on the geographic area map representative of the first set of GUI position values and the first set of corresponding GUI time values. In addition, a second graphical route (e.g., graphical route 520) may be displayed on the geographic area map representative of the second set of GUI position values and the second set of corresponding GUI time values. In such embodiments, the first graphical route (e.g., graphical route 502) may be rendered to have a first weight or a first color, and the second graphical route (e.g., graphical route 520) may be rendered to have a second weight or a second color. The first weight or the first color may be rendered to visually differ from (or to be visually similar to) the second weight or the second color based on differences of (or similarities to) a first quantity of GUI values of the first set of GUI position values and the first set of corresponding GUI time values (e.g., of graphical route 502) compared with a second quantity of GUI values of the second set of GUI position values and the second set of corresponding GUI time values (e.g., graphical route 520).

In the embodiment of FIG. 8, the interactive animated GUI (e.g., interactive animated GUI 503) rendering the plurality of graphical routes on the geographic area map defines a geographic heat map (e.g., geographic heat map 560) representation of each of the plurality of vehicle trips. In this way, the geographic heat map representation visually represents a frequency of travel (e.g., via the annotated graphical routes 502, 512, 514, 520, and 530 having various colors and/or weights) of the actual routes within the geographic area.

ADDITIONAL CONSIDERATIONS

With the foregoing, a user of the above telematics systems and methods who is a insurance customer or user may opt-in to rewards, insurance discount, or other type of program. After the insurance customer provides their permission or affirmative consent, an insurance provider telematics application and/or remote server may collect telematics and/or other data (including image or audio data) associated with insured assets, including before, during, and/or after an insurance-related event or vehicle accident, such as any event, etc., as may be determined from the vehicular telematics data, GUI values, environment data, vehicle status data, or other information or data as described herein. In return, risk averse drivers, and/or vehicle owners may receive discounts or insurance cost savings related to auto, home, life, and other types of insurance from the insurance provider.

In one aspect, telematics data, and/or other data, including the types of data discussed elsewhere herein, may be collected or received by an insured's mobile device or smart vehicle, a Telematics Application running thereon, and/or an insurance provider remote server, such as via direct or indirect wireless communication or data transmission from a Telematics Application ("App") running on the insured's mobile device or smart vehicle, after the insured or customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk driving behavior and/or technology that mitigates or prevents risk to (i) insured assets, such as vehicles or even homes, and/or (ii) vehicle operators or passengers.

Additional aspects include an a telematics cloud platform receiving telematics data and/or geographic location data from a large number of mobile computing devices (e.g., 100 or more), and issuing alerts to those mobile computing devices in which the alerts are relevant in accordance with the various techniques described herein.

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A vehicular telematics system for generating interactive animated guided user interfaces (GUIs) operable to provide scrubbed playback rendering of geospatial graphics, the vehicular telematics system comprising:
   a telematics cloud platform configured to receive vehicular telematics data from a telematics device onboard a vehicle, each of the vehicular telematics data including a geographic position of the telematics device and a time value of the geographic position, the vehicular telematics data defining a vehicular trip of a vehicle, the vehicular telematics data defining a telematics dataset having a first data size;
   a GUI value compression component implemented at the telematics cloud platform, the GUI value compression component configured to determine, based on the geographic positions and the time values of the vehicular telematics data, a plurality of GUI position values and a plurality of corresponding GUI time values, the plurality of GUI position values and the plurality of corresponding GUI time values defining a GUI value dataset having a second data size, the second data size having a reduced size compared to the first data size, wherein the plurality of GUI position values and the plurality of corresponding GUI time values include at least (1) a first GUI position value and a first GUI time value, and (2) a second GUI position value and a second GUI time value; and
   a geospatial animation application (app) configured to implement an interactive animated GUI on a display device, the interactive animated GUI configured to:
   receive the plurality of GUI position values and the plurality of corresponding GUI time values,
   render a plurality of geospatial graphics on a geographic area map via the display device, each geospatial graphic corresponding to a GUI position value of the plurality of GUI position values, and each geospatial graphic rendered at a GUI time value corresponding to the GUI position value,
   wherein the interactive animated GUI renders the plurality of geospatial graphics in a chronological order,
   wherein a first geospatial graphic is displayed on the geographic area map at the first GUI position value at the first GUI time value, and wherein a second geospatial graphic is displayed on the geographic area map at the second GUI position value at the second GUI time value, the first geospatial graphic rendered to have a first graphical form, and the second geospatial graphic rendered to have a second graphical form, wherein the first graphic form visually differs from the second graphical form based on differences of the first GUI position value or the first GUI position time value compared with the second GUI position value or the second GUI position time value,
   wherein the interactive animated GUI rendering the plurality of geospatial graphics in the chronologic order on the geographic area map defines an animated graphical representation of the vehicular trip, and
   wherein the interactive animated GUI is operable to provide scrubbed playback rendering of the geospatial graphics via user interaction with the geographic area map.

2. The vehicular telematics system of claim 1, wherein the interactive animated GUI generates the first graphical form and the second graphical form to have a same or similar graphical form where the first GUI position value and the first GUI position time value have similar values compared with the second GUI position value and the second GUI position time value.

3. The vehicular telematics system of claim 1, wherein the interactive animated GUI renders the first graphical form and the second graphical form to have a different graphical form where the first GUI position value and the first GUI position time value have divergent values compared with the second GUI position value and the second GUI position time value.

4. The vehicular telematics system of claim 1, wherein each of the telematics data comprise 15 hertz (Hz) telematics data.

5. The vehicular telematics system of claim 1 further comprising a dataset sequencing component implemented at the telematics cloud platform, the dataset sequencing component configured to determine a sequence of telematics data subsets from the plurality of the vehicular telematics data, each telematics data subset defining a range the plurality of the vehicular telematics data, wherein a first telematics data subset defines a first range of the plurality of the vehicular telematics data, and wherein a second telematics data subset defines a second range of the plurality of the vehicular telematics data, wherein the plurality of GUI position values and the plurality of corresponding GUI time values are determined based on the sequence of telematics data subsets, wherein each of the first GUI position value and the first GUI time value is determined from the first telematics data subset, and wherein each of the second GUI position value and the second GUI time value is determined from the first telematics data subset.

6. The vehicular telematics system of claim 5, wherein at least one of the first GUI position value or the second GUI position value corresponds to a particular geographic position of the vehicular telematics data.

7. The vehicular telematics system of claim 1 further comprising a graphic overlay component configured to annotate the geographic area map with an graphic overlay.

8. The vehicular telematics system of claim 7, wherein the telematics cloud platform is further configured to receive environment data associated with the vehicular trip, the environment data including an environment position and an environment time value of the environment position.

9. The vehicular telematics system of claim 8 further comprising an environment data correlation component configured to correlate the environment data with a particular geospatial graphic of the plurality of geospatial graphics, the environment position and the environment time value of the environment position of the environment data corresponding to the GUI position value and the GUI time value of the particular geospatial graphic.

10. The vehicular telematics system of claim 9, wherein the environment data is displayed via the graphic overlay when a user taps or hovers over the particular geospatial graphic.

11. The vehicular telematics system of claim 9, wherein the environment data is displayed via the graphic overlay when the interactive animated GUI renders the particular geospatial graphic.

12. The vehicular telematics system of claim 8, wherein the environment data is received from one or more remote platforms.

13. The vehicular telematics system of claim 7 further comprising a vehicle status analytics component implemented at the telematics cloud platform, the vehicle status analytics component configured to determine vehicle status data based on the vehicular telematics data, wherein the vehicle status data is associated with a particular GUI position value, and wherein the geospatial animation app is configured to receive the vehicle status data, the geospatial animation app further configured to associated the vehicle status data with a particular geospatial graphic, the particular geospatial graphic corresponding to the particular GUI position value.

14. The vehicular telematics system of claim 13, wherein the vehicle status data is displayed via the graphic overlay when a user taps or hovers over the particular geospatial graphic.

15. The vehicular telematics system of claim 14, wherein the vehicle status data is displayed via the graphic overlay when the interactive animated GUI renders the particular geospatial graphic.

16. The vehicular telematics system of claim 1, wherein scrubbed playback rendering of the geospatial graphics is initiated by a user selecting a GUI map position value from the geographic area map, and wherein the interactive animated GUI performs playback rendering of the geospatial graphics in the chronological order starting from a playback geospatial graphic of the plurality of geospatial graphics, the playback geospatial graphic having a playback GUI position value selected from the plurality of GUI position values, the playback GUI position value corresponding to the GUI map position value.

17. The vehicular telematics system of claim 1, wherein the interactive animated GUI is configured to render a time bar corresponding to the plurality of corresponding GUI time values, the time bar operable to scrub playback of the geospatial graphics on the geographic area map.

18. The vehicular telematics system of claim 17, wherein scrubbed playback rendering of the geospatial graphics via interaction with the geographic area map causes the time bar to be updated to represent a current GUI time selected from the plurality of corresponding GUI time values.

19. A vehicular telematics method of generating interactive animated guided user interfaces (GUIs) operable to provide scrubbed playback rendering of geospatial graphics, the vehicular telematics method comprising:

receiving, at a telematics cloud platform, vehicular telematics data from a telematics device onboard a vehicle, each of the vehicular telematics data including a geographic position of the telematics device and a time value of the geographic position, the vehicular telematics data defining a vehicular trip of a vehicle, the vehicular telematics data defining a telematics dataset having a first data size;

determining, via a GUI value compression component implemented at the telematics cloud platform, a plurality of GUI position values and a plurality of corresponding GUI time values based on the geographic positions and the time values of the vehicular telematics data, the plurality of GUI position values and the plurality of corresponding GUI time values defining a GUI value dataset having a second data size, the second data size having a reduced size compared to the first data size, wherein the plurality of GUI position values and the plurality of corresponding GUI time values include at least (1) a first GUI position value and a first GUI time value, and (2) a second GUI position value and a second GUI time value;

receiving, via a geospatial animation application (app) implementing an interactive animated GUI on a display device, the plurality of GUI position values and the plurality of corresponding GUI time values; and rendering, via the geospatial animation app implementing the interactive animated GUI, a plurality of geospatial graphics on a geographic area map via the display device, each geospatial graphic corresponding to a GUI position value of the plurality of GUI position values, and each geospatial graphic rendered at a GUI time value corresponding to the GUI position value, wherein the interactive animated GUI renders the plurality of geospatial graphics in a chronological order, wherein a first geospatial graphic is displayed on the geographic area map at the first GUI position value at the first GUI time value, and wherein a second geospatial graphic is displayed on the geographic area map at the second GUI position value at the second GUI time value, the first geospatial graphic rendered to have a first graphical form, and the second geospatial graphic rendered to have a second graphical form, wherein the first graphic form visually differs from the second graphical form based on differences of the first GUI position value or the first GUI position time value compared with the second GUI position value or the second GUI position time value, wherein the interactive animated GUI rendering the plurality of geospatial graphics in the chronologic order on the geographic area map defines an animated graphical representation of the vehicular trip, and wherein the interactive animated GUI is operable to provide scrubbed playback rendering of the geospatial graphics via user interaction with the geographic area map.

20. A tangible, non-transitory computer-readable medium storing instructions for generating interactive animated guided user interfaces (GUIs) operable to provide scrubbed playback rendering of geospatial graphics, that when executed by one or more processors of a computing device, the computing device including one or more memories, cause the computing device to:

receive, at a telematics cloud platform, vehicular telematics data from a telematics device onboard a vehicle, each of the vehicular telematics data including a geographic position of the telematics device and a time value of the geographic position, the vehicular telematics data defining a vehicular trip of a vehicle, the vehicular telematics data defining a telematics dataset having a first data size;

determine, via a GUI value compression component implemented at the telematics cloud platform, a plurality of GUI position values and a plurality of corresponding GUI time values based on the geographic positions and the time values of the vehicular telematics data, the plurality of GUI position values and the plurality of corresponding GUI time values defining a GUI value dataset having a second data size, the second data size having a reduced size compared to the first data size, wherein the plurality of GUI position values and the plurality of corresponding GUI time values include at least (1) a first GUI position value and a first GUI time value, and (2) a second GUI position value and a second GUI time value;

receive, via a geospatial animation application (app) implementing an interactive animated GUI on a display device, the plurality of GUI position values and the plurality of corresponding GUI time values; and render, via the geospatial animation app implementing the interactive animated GUI, a plurality of geospatial graphics on a geographic area map via the display device, each geospatial graphic corresponding to a GUI position value of the plurality of GUI position values, and each geospatial graphic rendered at a GUI time value corresponding to the GUI position value, wherein the interactive animated GUI renders the plurality of geospatial graphics in a chronological order, wherein a first geospatial graphic is displayed on the geographic area map at the first GUI position value at the first GUI time value, and wherein a second geospatial graphic is displayed on the geographic area map at the second GUI position value at the second GUI time value, the first geospatial graphic rendered to have a first graphical form, and the second geospatial graphic rendered to have a second graphical form, wherein the first graphic form visually differs from the second graphical form based on differences of the first GUI position value or the first GUI position time value compared with the second GUI position value or the second GUI position time value, wherein the interactive animated GUI rendering the plurality of geospatial graphics in the chronologic order on the geographic area map defines an animated graphical representation of the vehicular trip, and wherein the interactive animated GUI is operable to provide scrubbed playback rendering of the geospatial graphics via user interaction with the geographic area map.

* * * * *